(12) United States Patent
Sareen et al.

(10) Patent No.: US 10,282,379 B2
(45) Date of Patent: May 7, 2019

(54) TECHNIQUES FOR VISUALIZING STORAGE CLUSTER SYSTEM CONFIGURATIONS AND API THEREFORE

(71) Applicant: NETAPP, INC., Sunnyvale, CA (US)

(72) Inventors: Apoorva Sareen, Bangalore (IN); Shankar Pasupathy, Sunnyvale, CA (US); Ross Ackerman, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 549 days.

(21) Appl. No.: 14/928,532

(22) Filed: Oct. 30, 2015

(65) Prior Publication Data

US 2017/0124191 A1    May 4, 2017

(51) Int. Cl.
| | |
|---|---|
| *G06F 16/00* | (2019.01) |
| *G06F 16/951* | (2019.01) |
| *H04L 29/08* | (2006.01) |
| *G06F 9/54* | (2006.01) |

(52) U.S. Cl.
CPC ............ *G06F 16/951* (2019.01); *G06F 9/542* (2013.01); *H04L 67/1097* (2013.01)

(58) Field of Classification Search
CPC ....... G06F 9/45558; G06F 2009/45579; G06F 17/30088; G06F 3/067; G06F 17/30194; G06F 17/30197; G06F 2009/45583; G06F 2009/4557; G06F 3/0611; G06F 3/0653; G06F 11/1092; G06F 11/1451; G06F 2201/84; G06F 3/065; G06F 11/00; G06F 11/0727

See application file for complete search history.

(56) References Cited

U.S. PATENT DOCUMENTS

| | | | |
|---|---|---|---|
| 9,489,272 B2 * | 11/2016 | Kedem | ............... G06F 9/45558 |
| 9,762,460 B2 | 9/2017 | Pawlowski et al. | |
| 2003/0144868 A1 * | 7/2003 | MacIntyre | ........ G06F 17/30536 705/7.38 |
| 2009/0276714 A1 * | 11/2009 | Kandlikar | ............. G06F 3/0481 715/734 |
| 2012/0144002 A1 * | 6/2012 | Naganuma | ............ G06F 3/0605 709/220 |

(Continued)

OTHER PUBLICATIONS

Non-Final Office Action on co-pending (U.S. Appl. No. 14/928,247) dated May 10, 2018.

(Continued)

*Primary Examiner* — Yicun Wu
(74) *Attorney, Agent, or Firm* — Klein, O'Neill & Singh, LLP

(57) ABSTRACT

Various embodiments are generally directed to techniques for generating effective visualizations of some or all of a storage cluster system. An apparatus includes an API component of a visualization server to make an API available to be called by another device via a network to request information associated with an object that represents a component of a storage cluster system; and a translation component of the visualization server to, in response to a call to the API received via the network that requests information associated with the object, generate query instructions to search for a system entry corresponding to the storage cluster system within a system database and to search for the requested information within the system entry.

20 Claims, 18 Drawing Sheets

(56) References Cited

U.S. PATENT DOCUMENTS

| | | | |
|---|---|---|---|
| 2014/0082145 A1* | 3/2014 | Lacapra | H04L 67/1097 709/219 |
| 2014/0325620 A1* | 10/2014 | Samson | G06F 9/4443 726/5 |
| 2015/0310188 A1 | 10/2015 | Ford et al. | |
| 2016/0092443 A1 | 3/2016 | Hayes et al. | |
| 2016/0180356 A1 | 6/2016 | Parag et al. | |

OTHER PUBLICATIONS

Notice of Allowance on co-pending (U.S. Appl. No. 14/928,247) dated Jan. 3, 2019.

\* cited by examiner

TECHNIQUES FOR VISUALIZING STORAGE CLUSTER SYSTEM CONFIGURATIONS AND API THEREFORE

BACKGROUND

Storage cluster systems are often assembled from a complex collection of hardware and software components that may be selected from a wide range of options. Such selections are often based on storage requirements that differ from client to client. Also, as time passes, client needs may change and available options for replacing and/or upgrading hardware or software components of a storage cluster system may change Thus, each storage cluster system may be of a relatively unique configuration from the date of its installation and/or may become relatively unique over time. This may make lessons learned during the operation of one storage cluster system harder to apply to another.

Additionally, larger storage cluster systems may be made up of significant greater quantities of components and/or those components may be more thoroughly geographically dispersed. Such measures may be to increase overall storage capacity, to increase speed of access to client data and/or to increase redundancy to more ably handle a wider variety of failures that may occur. Also, those components may also be interconnected by a larger quantity and/or greater complexity of network connections.

As a result, administrators of storage cluster systems may encounter various challenges in diagnosing problems, maintaining, repairing and/or upgrading such storage cluster systems. By way of example, administrators charged with overseeing multiple storage cluster systems may find it difficult to grasp the details of enough of the components of a storage cluster system to understand interactions among those components, in addition to grasping the details of an event and/or various automated responses to that event.

DETAILED DESCRIPTION

Figure 1:
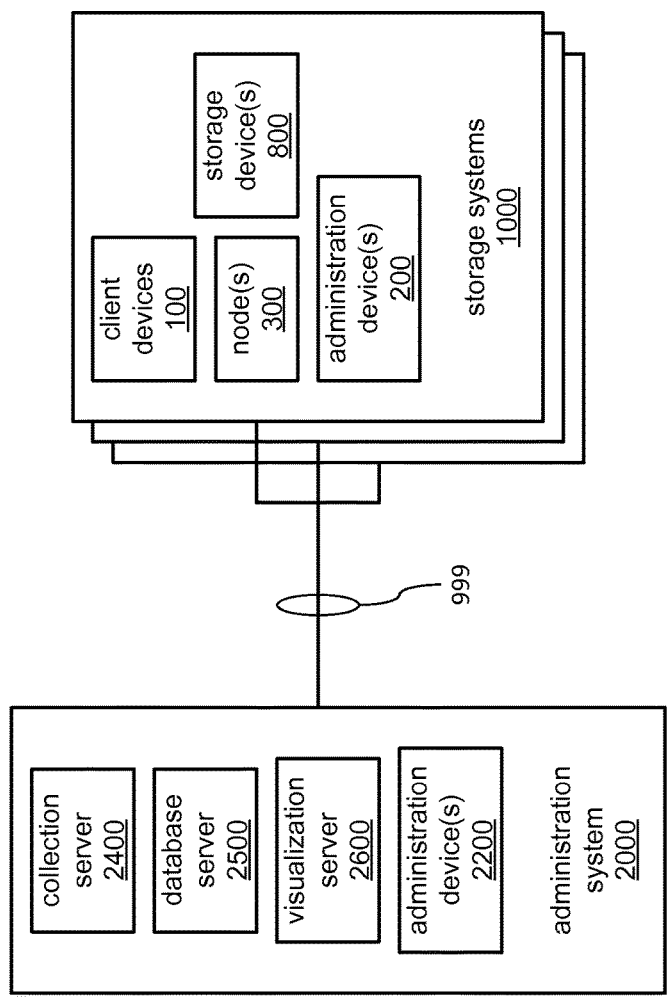
FIG. 1 illustrates an example embodiment of an administration system exchanging data with multiple storage cluster systems.

Various embodiments are generally directed to techniques for generating effective visualizations of some or all of a storage cluster system. An ingest server of an administration system may collect information concerning various aspects of the operation of one or more storage cluster systems, and may store such information in an account database that associates particular storage cluster systems with particular operators of storage cluster systems. A database server of the administration system may recurringly access the account database to recurringly generate and/or update system entries for individual storage cluster systems in a system database organized in a manner in which components of clusters are treated as objects and relationships between such components are treated as properties of those objects. A visualization server may, through a network, make the system database accessible to one or more administration devices operated by administrative personnel tasked with overseeing the operation of one or more storage cluster systems. The visualization server may provide an application programming interface (API) for use by the one or more administration devices through a network to selectively retrieve information from the system database concerning aspects of a particular storage cluster system at a particular point in time or through a period of time by specifying one or more particular objects and/or one or more particular times. Such an administration device may employ the object-based manner in which information is organized in the system database to provide a corresponding object-based graphical visualization of at least a portion of the storage cluster system.

The information collected from each storage cluster system by the ingest server may include indications of what hardware and/or software components make up a storage cluster system, the manner in which those components are coupled, features of those components that are used and/or are not used, client applications for which client data is stored, the types and quantities of client data stored, occurrences of various events affecting storage of the client data and their outcomes, and/or the manner in which to contact one or more administrators. Such events may include component failures, instances of limits in capacity or bandwidth being reached or exceeded, changes in the configuration of storage volumes, installations or changes in components, changes in the manner in which components are coupled, etc. The ingest server may poll one or more storage cluster systems for such information on a recurring basis, and/or await transmission of such information to the ingest server by one or more of the storage cluster systems via a network. One or more of the storage cluster systems may transmit such information to the ingest server in response to the occurrence of one or more particular events as part of providing a record thereof to the administration system for subsequent diagnostics.

The storage cluster systems from which the ingest server receives such information may vary greatly in complexity and capability. By way of example, one or more of the storage cluster systems may incorporate a single node providing a single controller of a relatively small quantity of storage devices that may or may not be operated together as an array of storage devices. Such relatively simple storage cluster systems may incorporate relatively few hardware components and/or software components, and may simply be used as archival or "backup" storage for the client data stored within the client devices to guard against loss of client data should a malfunction of one of the client devices occur. As a result, the information transmitted by such a relatively simple storage cluster system to the ingest server may correspondingly be relatively simple in content. Also such information may be transmitted relatively infrequently or in response to a change in the components and/or configuration of the storage cluster system.

Alternatively and also by way of example, one or more of the storage cluster systems may incorporate multiple nodes and/or numerous storage devices. Multiple sets of the storage devices may be operated together as fault-tolerant arrays on which client data may be stored in a fault-tolerant manner that prevents loss of client data in the event of a malfunction of one of the storage devices. Also, two or more of the multiple nodes may be interconnected to form high-availability (HA) groups of nodes to support redundancy among the controllers provided by each of the nodes in which one node may take over for the other in the event of a failure of a node. Further, the multiple nodes and multiple storage devices may be divided into multiple clusters that may be installed at geographically distant locations, but that may be interconnected in a manner in which the state of the client data stored within the storage devices of one cluster may be mirrored in the state of the client data stored within the storage devices of another cluster. As a result, the information transmitted by such a relatively complex storage cluster system to the ingest server may correspondingly be relatively complex in content. Also such information may be transmitted relatively frequently on a timed basis and/or in response to changes in the components and/or configuration of the storage cluster system, as well as in response to various events such as a takeover between nodes or other automated resolution to a detected problem.

In various embodiments, the operator of the administration system may be a purveyor of the storage cluster systems from which the ingest server receives such information, such as a manufacturer, distributor, reseller, installer and/or repairer of those storage cluster systems. Thus, each of the operators of one or more of those storage cluster systems may be a customer of such a purveyor, and so each of the operators of one or more of those storage cluster systems may be deemed an account of the operator of the administration system. Each of those storage cluster system operators may be a corporate, governmental, non-profit or other entity that employs one or more of such storage cluster systems for use in storing their own data. Alternatively or additionally, each of those storage cluster system operators may be a corporate, governmental, non-profit or other entity that operates one or more of such storage cluster systems to provide storage services and/or other services that include storage services to a multitude of end users of those services. As part of operating one or more of such storage cluster systems, each of those storage cluster system operators may employ or otherwise engage the services of one or more administrators to oversee the operation thereof. Those administrators may be responsible for allocating available storage resources, maintenance, security, performing upgrade and/or diagnosing failures. Also, the operator of the administration system may similarly employ or otherwise engage the services of one or more assisting administrators to assist the administrators associated with the storage cluster system operators. Indeed, each of such assisting administrators may be assigned a particular subset of the storage cluster system operators to which they are to provide such assistance.

Thus, the ingest server may organize the account database to include a separate account entry for each operator of one or more storage cluster systems from which the ingest server receives information. For each storage cluster system operator that operates more than one storage cluster system, the ingest server may further organize each of their associated account entries into multiple system entries that each correspond to one of their storage cluster systems. As information is received from each of the storage cluster systems, that information may be stored within the account entry and/or a separate system entry associated with the operator of that storage cluster system and/or associated with that one of multiple storage cluster systems operated by that operator. Alternatively or additionally, the ingest server may organize the information received from each of the storage cluster systems by time, such as and not limited to, the time at which an event occurred, the time at which a change in the configuration of a storage cluster system was made, and/or the time at which a piece of information was received from a storage cluster system.

The database server may access the data stored within each of the account entries and/or system entries of the account database on a recurring basis to identify information signaling a change in configuration of a storage cluster system and/or an event occurring within a storage cluster system triggering an update in a system entry for that storage cluster system in the system database. The manner in which information is organized within the system database and/or within each of the system entries thereof may be based on treating each storage cluster system and/or each of various components of a storage cluster system as an object. Thus, at least a portion of each system entry may be organized to store information about the storage cluster system to which it corresponds as an object having various properties. Some objects may correspond to components that are incorporated into other components such that there is a relationship of one or more components being "inside" another component. Other objects may correspond to hardware components that are electrically coupled or may correspond to software components that communicate with each other. Indications of the kinds of relationships that one object has to another may also be treated as properties of those objects. The database server may maintain organizational data that specifies the manner in which data associated with each object is to be organized or formatted, such as a type of data structure specified to be used in storing indications of the various properties of each object.

Thus, the database server may, in accordance with the organizational data, allocate space within a system entry of the system database to store information associated with each node and/or each storage device of a storage cluster system as an object. Indications of such information as manufacturer, date of manufacture, model, version, features, which features are enabled, assigned identifiers, etc. may be stored as properties for each such object. Alternatively or additionally, combinations of components that have been configured to cooperate to act as a cluster, a HA group, a drive array, etc. may be treated as objects, and indications of the manner in which they are coupled, RAID level, which are active, which are on standby to take over, etc. may be stored as properties for each such object. Also alternatively or additionally, allocated spaces in which to store data may be treated as objects such that an aggregate defined within the storage space provided by one or more storage devices, and which may be divided into one or more volumes, may be treated as an object and/or each of those volumes may be treated as an object such that space may be allocated for each within a system entry of the system database.

In some embodiments, indications of the manner in which each object is related to one or more other objects may be stored as part of the properties of that object. In other embodiments, information concerning each relationship between two or more objects may be separately stored along with indications of properties of each of those relationships. Thus, an indication of the fact that a particular storage device is coupled to a particular node or an indication that a particular volume is defined within a particular aggregate may be stored as part of the properties of those objects or may be separately stored. Further, among the indications of properties stored for each object and/or for each relationship among two or more objects may be various temporal indications, such as when a particular object or relationship was added and/or removed, and/or when various events affecting each object or relationship occurred. Alternatively or additionally, in various embodiments, indications of events associated with an object or a relationship among objects may be stored among the properties of an object or a relationship, or may be separately stored in a data structure of events that is associated by the system database with an object or a relationship.

The visualization server may be coupled by one or more networks to administration devices operated by administrators of one or more operators of one or more storage cluster systems, and/or operated by assistant administrators of a purveyor of the one or more storage cluster systems. Through an exchange of commands and information requested from a system entry of the system database, the visualization server and an administration device may cooperate to provide an administrator with a visualization of the status of various portions of a storage cluster system at one or more particular times and/or through a period of time to enhance the ability of the administrator to diagnose causes of malfunctions and/or to perform other oversight duties. The commands may entail the use of the API provided by the visualization server directly (e.g., via direct entry with a terminal session) or indirectly (e.g., conveyed among other commands and/or data in a scripting language).

Initially, as a result of an administrator operating an administration device to request an initial visualization of a particular storage cluster system, that administration device may transmit a command to the visualization server to get a visualization of that storage cluster system in its current state. In some embodiments, such an initial command may be directly typed by the administrator at a command line provided by a user interface (UI) of the administration device. In other embodiments, the UI may present a menu or other form of listing of storage cluster systems from which the administrator may select the particular storage cluster system, thereby triggering the transmission of such a command. Regardless of the manner in which the command is generated and/or caused to be transmitted to the visualization server, the visualization server may retrieve information from the database server concerning the particular storage cluster system and may relay it to the administration device to be presented on a display as an initial visualization of the particular storage cluster system to the administrator.

As previously discussed, information concerning storage cluster systems is stored within the system database in an object-based manner in which components and/or subparts of components of the particular storage cluster system may be stored in a manner that treats each as an object with associated indications of properties. Thus, the information retrieved and relayed to the administration device by the visualization server may be have such an object-based organization. Further, in some embodiments, the visualization server may provide the object-based information to the administration device and allow the administration device to derive the initial visualization of the particular storage cluster system that it presents on a display to the administrator. However, in other embodiments, the visualization server may, itself, derive and generate the initial visualization, and may transmit a representation of the initial visualization to the administration device that enables the administration device to simply present the initial visualization on a display thereof.

Regardless of the manner in which the administration device is caused to and/or enabled to present the initial visualization, the administrator operating the administration device may make use of the UI provided by the administration device to interact with the initial visualization in any of a variety of ways to provide an indication of what portion of the particular storage cluster system the administrator seeks to focus on. In some embodiments, the UI may enable the administrator to select that portion by any of a variety of highlighting techniques. Alternatively or additionally, the administrator may make use of the UI to indicate that the administrator seeks to view the state of the particular storage cluster system (or the portion thereof) at a time different than the current time. As a result of such operation of the UI, the administration device may transmit one or more new commands to the visualization server for different information concerning the particular storage cluster system needed to enable the presentation of the visualization requested by the administrator.

As an alternative to requesting a visualization of the state of the particular storage cluster system (or a portion thereof) at a particular time (whether it is the current time or an earlier time), the UI may enable the administrator to specify a range of time and request a visualization of changes occurring in the state of the particular storage cluster (or a portion thereof) that occurred during that range of time. More specifically, the UI may enable the administrator to specify two points of time in a timeline and request a visualization of the differences in the state of the particular storage cluster system (or a portion thereof) between those two points in that timeline. Such operation of the UI may trigger the administration device to transmit a command to the visualization server for information concerning the differences between the states of the particular storage cluster system at those two times.

In some embodiments, the administration device may directly transmit such commands to the visualization server. In other embodiments, the administration device may cause such commands to be conveyed to the visualization server indirectly as parameters of other commands of a scripting language such as the hypertext markup language (HTML). Indeed, in some embodiments, such indirect conveyance of commands to the visualization server may effect the calling of the API provided by the visualization server in a manner referred to as a representational state transfer (REST) API in which the commands of the scripting language are used in a way in which interpretation of the scripting language itself by the visualization server is not necessary to separate the commands from the scripting language and/or to interpret the commands.

In some embodiments, the visualization server may translate the commands received from the administrative device for information concerning the state of at least a portion of the particular storage cluster system at a particular time or concerning differences in state between two times into one or more instructions making up a search query in a database query language. The visualization server may then transmit that query to the database server to enable a database component of the database server to retrieve the requested information.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of an administration system 2000 interacting with multiple storage cluster systems 1000 via a network 999. As depicted, the administration system 2000 may incorporate one or more administration devices 2200, an ingest server 2400, a database server 2500 and/or a visualization server 2600. As also depicted, each of the storage cluster systems 1000 may incorporate one or more client devices 100, one or more administration devices 200, one or more nodes 300 and/or one or more storage devices 800. As further depicted, and as will be discussed in greater detail, one or more of the devices of each of the storage cluster systems 1000 may exchange data with one or more of the devices of the administration system 2000 via the network 999. The network 999 may be a single network limited to extending within a single building or other relatively limited area, may include a combination of connected networks extending a considerable distance, and/or may include the Internet.

Within each of the storage cluster systems 1000, the one or more nodes 300 may control the one or more storage devices 800 to store client data received from the one or more client devices. The one or more administration devices 200 and/or 2200 may be operated by administrator(s) to configure aspects of the operation of the one or more nodes 300 and/or to configure aspects of the manner in which the client data is stored within the one or more storage devices 800. On a recurring basis, at least one of the nodes 300 of each of the storage cluster systems 1000 may transmit various pieces of information concerning the configuration and operation of that one of the storage cluster systems 1000 to the ingest server 2400 of the administration system 2000. Also, the visualization server 2600 may enable administrators operating the one or more administration devices 200 and/or 2200 to obtain object-based visualizations of at least a portion of the storage cluster system 1000.

Within the administration system 2000, the ingest server 2400 may store and organize the information received via the network 999 from at least one node 300 of each of the storage cluster systems 1000 concerning various aspects of the operation of the storage cluster systems 1000. The ingest server 2400 may store such information in an account database that associates particular storage cluster systems with particular accounts. The database server 2500 may recurringly access the account database to recurringly generate and/or update system entries for individual storage cluster systems in a system database organized in a manner in which at least components of clusters are treated as objects, and in which relationships between components such as interconnections therebetween may be treated as properties of those components. The visualization server 2600 may, through the network 999, make the system database accessible to the one or more administration devices 200 and/or 2200 to enable the presentation of visualizations of at least a portion of one or more of the storage cluster systems 1000 thereby to administrators tasked with overseeing the operation thereof. In so doing, the visualization server may provide a REST API for use by the one or more administration devices 200 and/or 2200 to selectively request information from the system database concerning aspects of the state of at least a portion of one or more of the storage cluster systems 1000 at a particular time or concerning differences in those aspects between two particular times. The information provided to the one or more administration devices 200 and/or 2200 may have the object-based organization of the system database maintained by the database server 2500, and the one or more administration devices 200 and/or 2200 may generate visualizations that reflect that object-based organization.

In various embodiments, the operator of the administration system 2000 may be a purveyor of the storage cluster systems 1000 from which the ingest server 2400 receives such information, such as a manufacturer, distributor, reseller, installer and/or repairer of those storage cluster systems. Thus, each of the operators of one or more of those storage cluster systems 1000 may be a customer of such a purveyor. Each of those storage cluster system operators may be a corporate, governmental, non-profit or other entity that employs one or more of such storage cluster systems for use in storing their own data. Alternatively or additionally, each of those storage cluster system operators may operate one or more of such storage cluster systems to provide storage services and/or other services that require storage to a multitude of end users of those services. As part of operating one or more of such storage cluster systems, each of those storage cluster system operators may employ or otherwise engage the services of the one or more administrators to oversee the operation thereof through operation of the one or more administration devices 200 of each of the storage cluster systems 1000. Also, the operator of the administration system 2000 may similarly employ or otherwise engage the services of the one or more assisting administrators to assist the administrators associated with the storage cluster system operators.

Figure 2A:
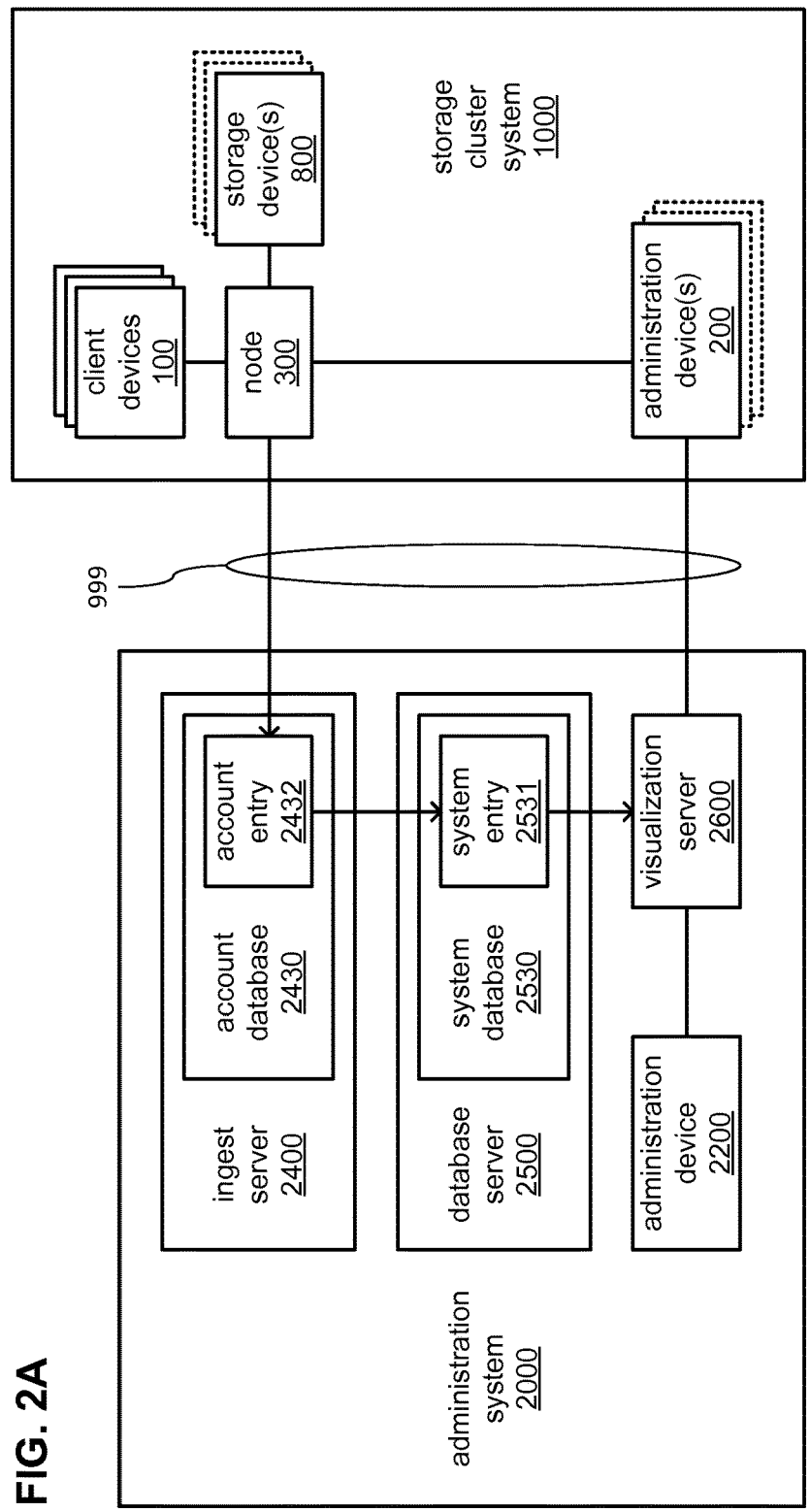
FIG. 2A illustrates an example embodiment of an administration system.
Figure 2B:
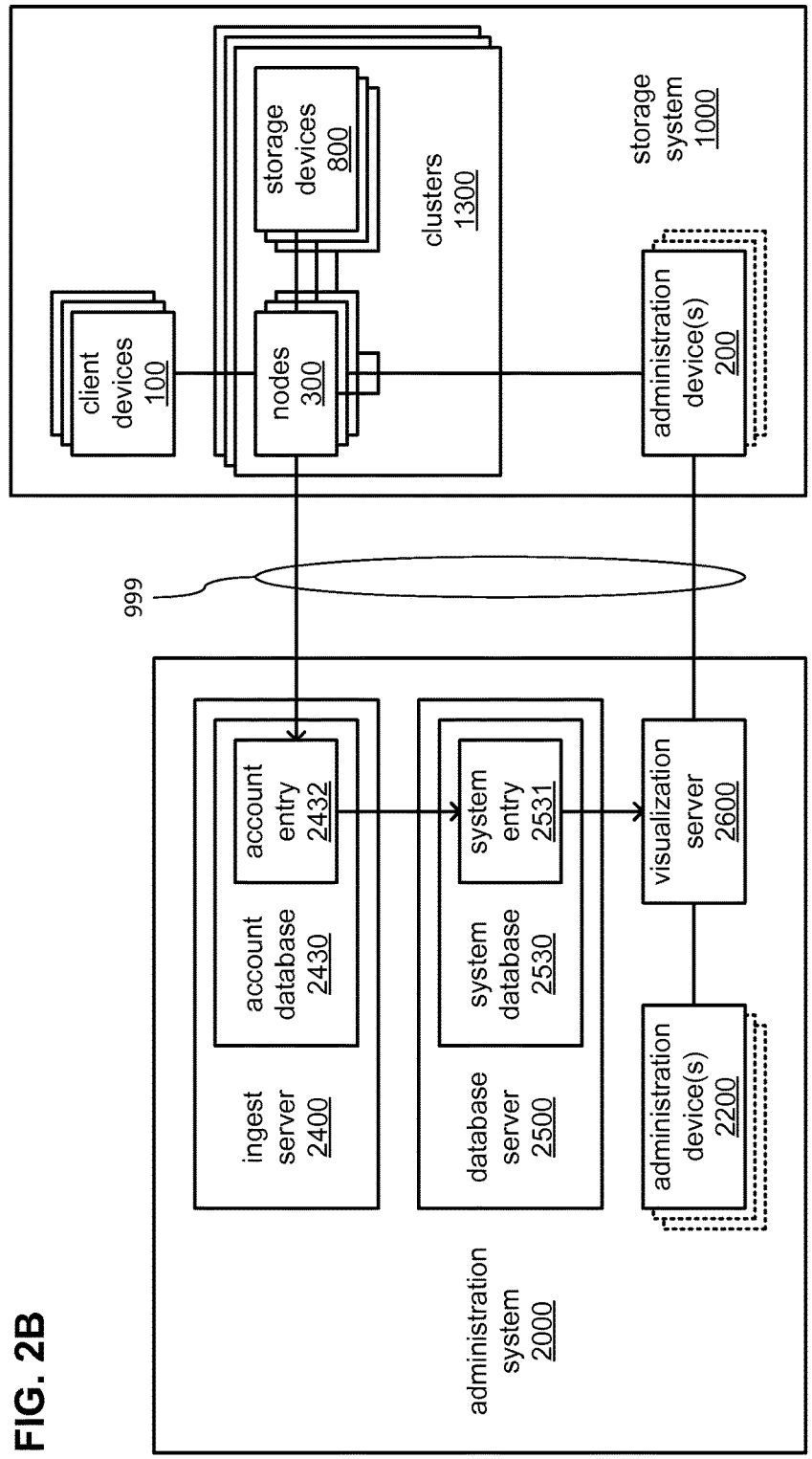
FIG. 2B illustrates an alternate example embodiment of an administration system.

FIGS. 2A and 2B each illustrate a block diagram of the administration system 2000 interacting with a storage cluster system 1000 through the network 999 in greater detail. In FIG. 2A, the administration system 2000 may interact with a relatively simple embodiment of the storage cluster system 1000 that incorporates a single node 300 that controls the one or more storage devices 800. In FIG. 2B, the administration system 2000 may interact with a relatively complex embodiment of the storage cluster system 1000 that incorporates multiple ones of the nodes 300 and of the storage devices 800 that may be organized into multiple clusters 1300 in which the manner in which client data is stored within one set of the storage devices 800 is mirrored within another set of the storage devices 800 at what may be geographically distant locations to increase fault tolerance.

Referring to both FIGS. 2A and 2B, regardless of the degree of complexity of any of the multiple storage cluster systems 1000 with which the administration system 2000 interacts, the information received by the ingest server 2400 from one of the nodes 300 of each of the storage cluster systems 1000 is stored within an account entry 2432 associated with an operator of one or more of the storage cluster systems 1000. For each such operator, a separate account entry 2432 is defined within an account database 2430 maintained by the ingest server 2400, and each account entry 2432 may include the information received from all of the storage cluster systems 1000 operated by a single such operator.

The database server 2500 recurringly accesses each of the account entries 2432 to determine if any new information has been received concerning aspects of operation of any of the one or more storage cluster systems 1000 from which the ingest server 2400 may receive information to determine whether any information stored within the system database 2530 is to be updated. As depicted, the system database 2530 may be made up of one or more system entries 2531, each of which may correspond to a single storage cluster system 1000. As previously discussed, within each of the system entries 2531, information concerning various aspects of a storage cluster system 1000 is organized into objects having properties. As also previously discussed, the visualization server 2600 receives and responds to commands from one or more of the administration devices 200 and/or 2200 for information concerning at least a portion of one of the one or more storage cluster systems 1000 for which a system entry 2531 may be present within the system database 2530.

Figure 3:
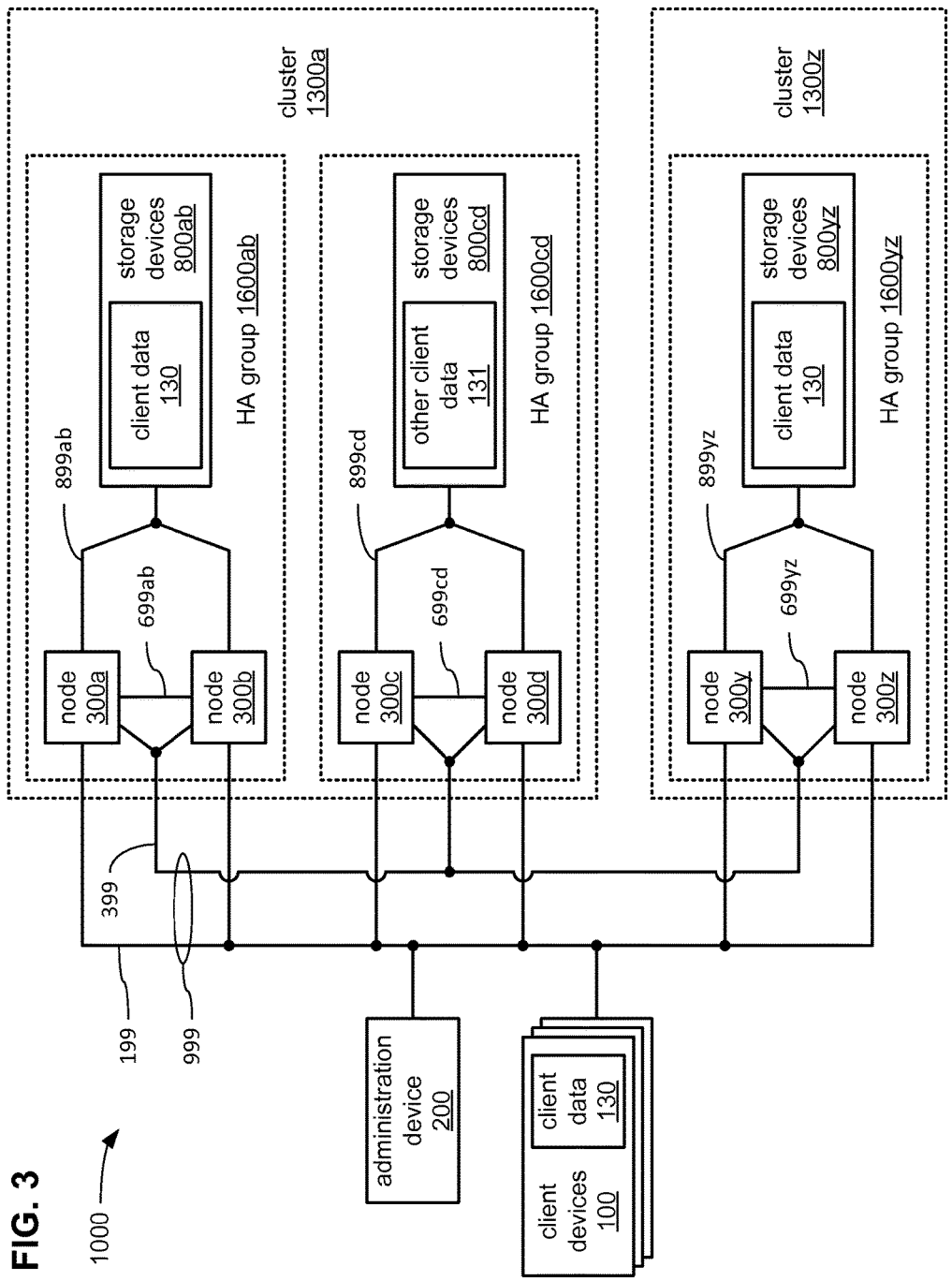
FIG. 3 illustrates an example embodiment of a storage cluster system.

FIG. 3 illustrates a block diagram of an example embodiment of the storage cluster system 1000 incorporating the one or more client devices 100, the one or more administration devices 200, and/or the one or more clusters 1300, such as the depicted clusters 1300*a* and 1300*z*. As depicted, the cluster 1300*a* may incorporate one or more of the nodes 300, such as the depicted nodes 300*a-d*, and one or more of the storage devices 800, such as the depicted sets of storage devices 800*ab* and 800*cd*. As also depicted, the cluster 1300*z* may incorporate more of the nodes 300, such as the depicted nodes 300*y-z*, and more of the storage devices 800, such as the depicted sets of storage devices 800*yz*. As further depicted, the cluster 1300*a* may include a HA group 1600*ab* incorporating the nodes 300*a-b* as partners and the set of storage devices 800*ab*. The cluster 1300*a* may also include a HA group 1600*cd* incorporating the nodes 300*c-d* as partners and the set of storage devices 800*cd*. Correspondingly, the cluster 1300*z* may include a HA group 1600*yz* incorporating the nodes 300*y-z* as partners and the set of storage devices 800*yz*. It should be noted that within the storage cluster system 1000, each of the clusters 1300*a* and 1300*z* is an instance of a cluster 1300, each of the sets of storage devices 800*ab*, 800*cd* and 800*yz* represents one or more instances of a storage device 800, and each of the nodes 300*a-d* and 300*y-z* is an instance of the node 300 as earlier depicted and discussed in reference to FIGS. 1 and 2.

In some embodiments, the clusters 1300*a* and 1300*z* may be positioned at geographically distant locations to enable a degree of redundancy in storing and retrieving client data 130 provided by one or more of the client devices 100 for storage. Such positioning may be deemed desirable to enable continued access to the client data 130 by one or more of the client devices 100 and/or the administration device 200 despite a failure or other event that may render one or the other of the clusters 1300*a* or 1300*z* inaccessible thereto. As depicted, one or both of the clusters 1300*a* and 1300*z* may additionally store other client data 131 that may be entirely unrelated to the client data 130.

The formation of the HA group 1600*ab* with at least the two nodes 300*a* and 300*b* partnered to share access to the set of storage devices 800*ab* may enable a degree of fault tolerance in accessing the client data 130 as stored within the set of storage devices 800*ab* by enabling one of the nodes 300*a-b* in an inactive state to take over for its partner in an active state (e.g., the other of the nodes 300*a-b*) in response to an error condition within that active one of the nodes 300*a-b*. Correspondingly, the formation of the HA group 1600*yz* with at least the two nodes 300*y* and 300*z* partnered to share access to the set of storage devices 800*yz* may similarly enable a degree of fault tolerance in accessing the client data 130 as stored within the set of storage devices 800*yz* by similarly enabling one of the nodes 300*y-z* in an inactive state to similarly take over for its partner in active state (e.g., the other of the nodes 300*y-z*).

As depicted, any active one of the nodes 300*a-d* and 300*y-z* may be made accessible to the client devices 100 and/or the administration device 200 via a client interconnect 199. As also depicted, the nodes 300*a-d* and 300*y-z* may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. Again, the network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 and/or the administration device 200 to be positioned at geographically diverse locations, while the inter-cluster interconnect 399 may extend through a leased line between the two geographically distant locations at which each of the clusters 1300a and 1300z are positioned.

As depicted, the partnered nodes within each of the HA groups 1600ab, 1600cd and 1600yz may be additionally coupled via HA interconnects 699ab, 699cd and 699yz, respectively. As also depicted, the nodes within each of the HA groups 1600ab, 1600cd and 1600yz may be coupled to the sets of storage devices 800ab, 800cd and 800yz in a manner enabling shared access via storage interconnects 899ab, 899cd and 899yz, respectively. The partnered nodes and set of storage devices making up each of the HA groups 1600ab, 1600cd and 1600yz may be positioned within relatively close physical proximity to each other such that the interconnects 699ab, 899ab, 699cd, 899cd, 699yz and 899yz may each traverse a relatively short distance (e.g., extending within a room and/or within a cabinet).

More broadly, one or more of the interconnects 199, 399, 699ab, 699cd and 699yz may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899ab, 899cd and 899yz may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300a and 1300z, other embodiments are possible that incorporate differing quantities of HA groups and nodes. Further, although each of the HA groups 1600ab, 1600cd and 1600yz is depicted as incorporating a pair of nodes 300a-b, 300c-d and 300y-z, respectively, other embodiments are possible in which one or more of the HA groups 1600ab, 1600cd and 1600yz may incorporate more than two nodes.

Figure 4A:
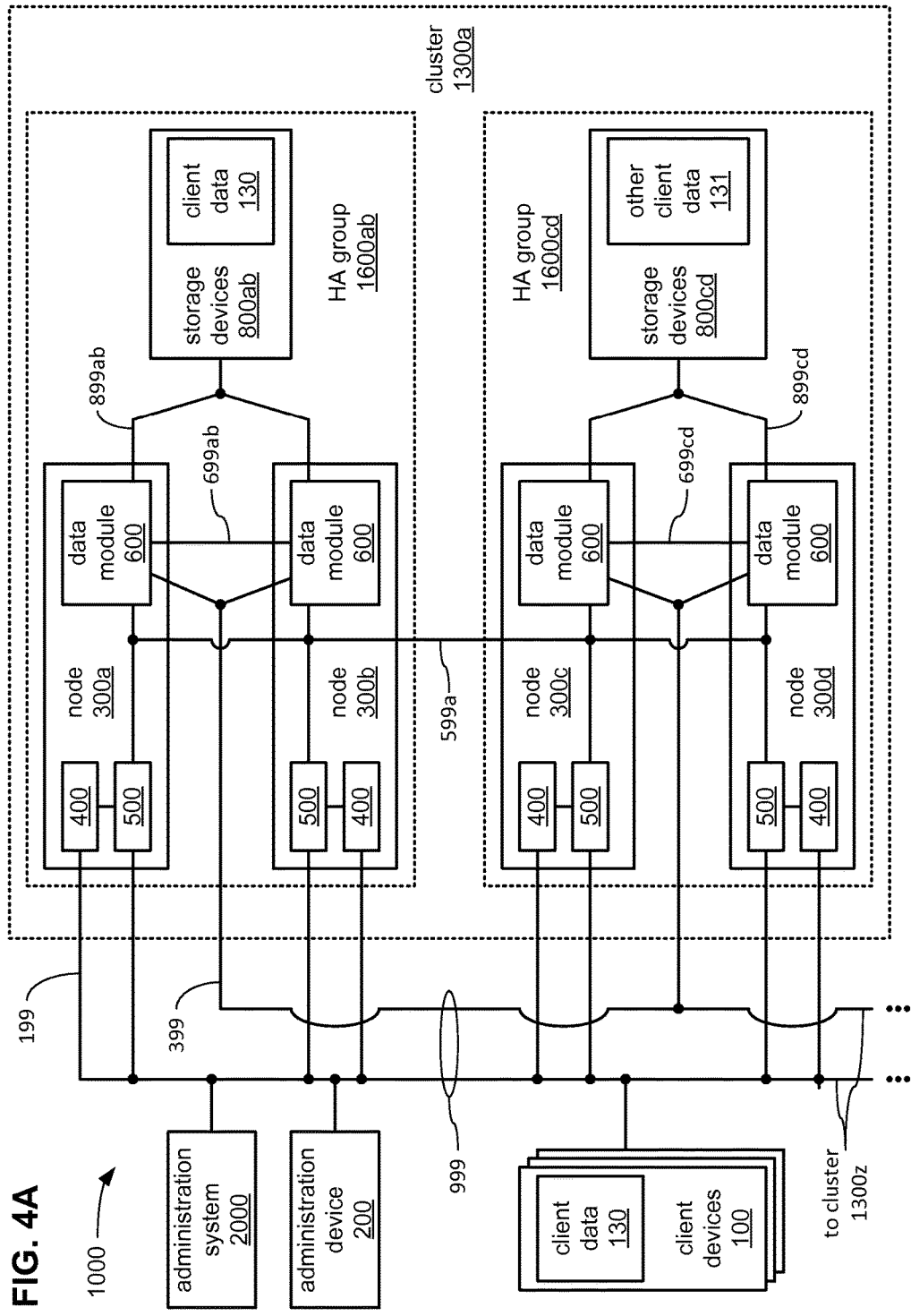
FIG. 4A illustrates an example embodiment of a pair of high availability groups of a cluster.
Figure 4B:
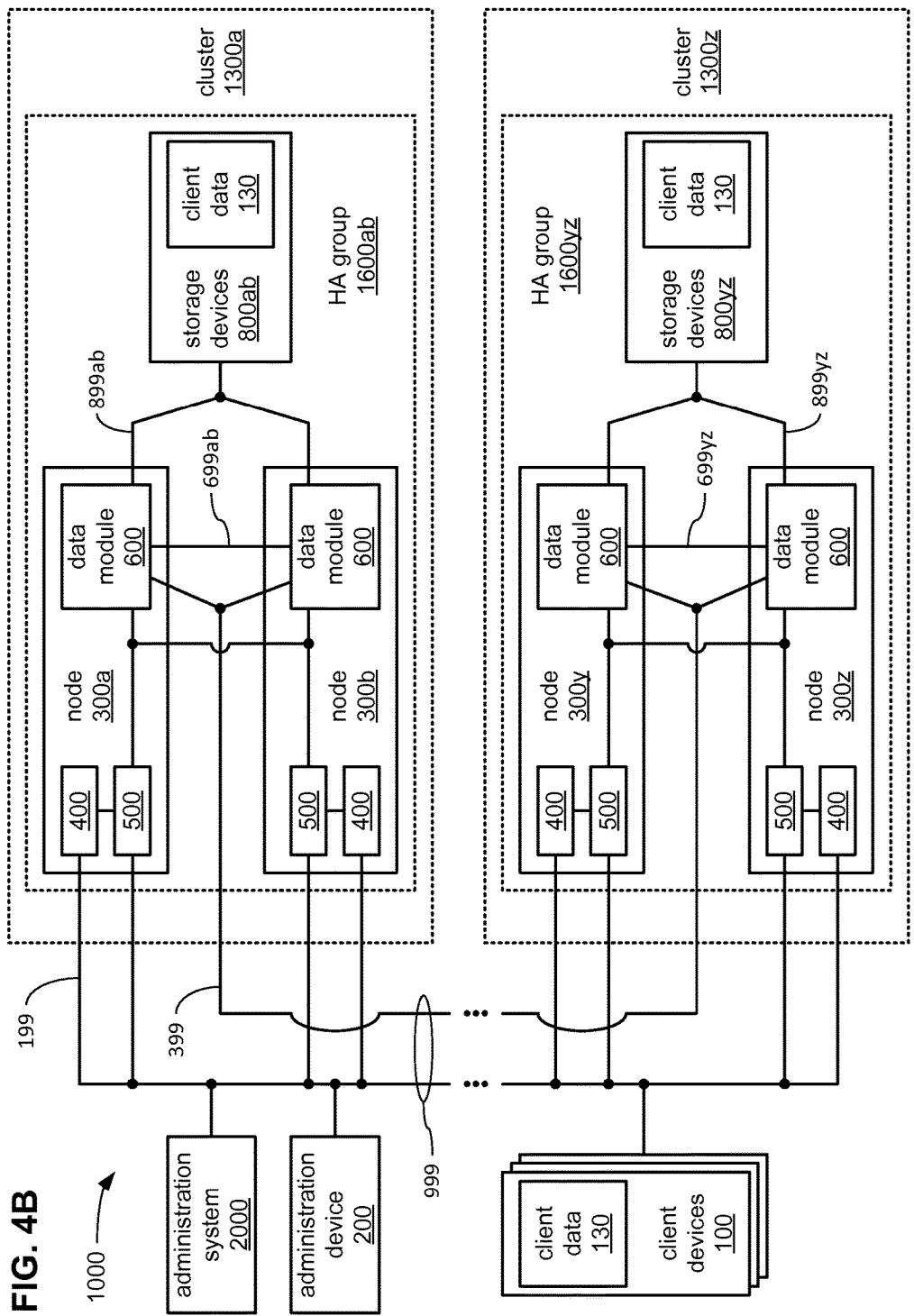
FIG. 4B illustrates an example embodiment of a pair of high availability groups of different clusters.

FIGS. 4A and 4B each illustrate a block diagram of an example portion of the embodiment of the storage cluster system 1000 of FIG. 3 in greater detail. More specifically, FIG. 4A depicts aspects of the nodes 300a-d and interconnections thereamong within the cluster 1300a in greater detail. FIG. 4B depicts aspects of the interconnections among the nodes 300a-b and 300y-z, including interconnections extending between the clusters 1300a and 1300z, in greater detail.

Referring to both FIGS. 4A and 4B, each of the nodes 300a-d and 300y-z may incorporate one or more of a managing module 400, a network module 500 and a data module 600. As depicted, each of the managing modules 400 and the network modules 500 may be coupled to the client interconnect 199, by which each may be accessible to one or more of the client devices 100, the administration device 200, and/or to the administration system 2000. The managing module 400 of one or more active ones of the nodes 300a-d and 300y-z may cooperate with the administration device 200 via the client interconnect 199 to allow an operator of the administration device 200 to configure various aspects of the manner in which the storage cluster system 1000 stores and provides access to the client data 130 provided by one or more of the client devices 100. That same managing module 400 may also recurringly transmit indications of that configuration and other information concerning the storage cluster system 1000 to the ingest server 2400 of the administration system 2000. The network module 500 of one or more active ones of the nodes 300a-d and 300y-z may receive and respond to requests for storage services received from one or more of the client devices 100 via the client interconnect 199, and may perform a protocol conversion to translate each storage service request into one or more data access commands.

As depicted, the data modules 600 of all of the nodes 300a-d and 300y-z may be coupled to each other via the inter-cluster interconnect 399. Also, within each of the HA groups 1600ab, 1600cd and 1600yz, data modules 600 of partnered nodes may share couplings to the sets of storage devices 800ab, 800cd and 800yz, respectively. More specifically, the data modules 600 of the partnered nodes 300a and 300b may both be coupled to the set of storage devices 800ab via the storage interconnect 899ab, the data modules 600 of the partnered nodes 300c and 300d may both be coupled to the set of storage devices 800cd via the storage interconnect 899cd, and the data modules 600 of the partnered nodes 300y and 300z may both be coupled to the set of storage devices 800yz via the storage interconnect 899yz. The data modules 600 of active ones of the nodes 300a-d and 300y-z may perform the data access commands derived by one or more of the network modules 500 of these nodes from translating storage service requests received from one or more of the client devices 100.

Thus, the data modules 600 of active ones of the nodes 300a-d and 300y-z may access corresponding ones of the sets of storage devices 800ab, 800cd and 800yz via corresponding ones of the storage interconnects 899ab, 899cd and 899yz to store and/or retrieve client data 130 as part of performing the data access commands. The data access commands may be accompanied by portions of the client data 130 to store and/or newer portions of the client data 130 with which to update the client data 130 as stored. Alternatively or additionally, the data access commands may specify portions of the client data 130 to be retrieved from storage for provision back to one or more of the client devices 100.

Further, and referring to FIG. 4B, the data module 600 of an active one of the nodes 300a-b and 300y-z of one of the clusters 1300a or 1300z may replicate the data access commands and transmit the resulting replica data access commands via the inter-cluster interconnect 399 to another active one of the nodes 300a-b and 300y-z of the other of the clusters 1300a or 1300z to enable at least partial parallel performance of the data access commands by two of the data modules 600. In this way, the state of the client data 130 as stored within one of the sets of storage devices 800ab or 800yz may be mirrored within the other of the sets of storage devices 800ab or 800yz, as depicted.

Such mirroring of the state of the client data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699ab, 699cd and 699yz) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300a and 300b may render both of the nodes 300a and 300b inaccessible to the client devices 100 such that the client data 130 stored within the sets of storage devices 800ab becomes inaccessible through either of the nodes 300a or 300b. With both of the sets of the storage devices 800ab and 800yz mirroring the state of the client data 130, the client devices 100 are still able to access the client data 130 within the set of storage devices 800yz, despite the loss of access to the set of storage devices 800ab.

Referring again to both FIGS. 4A and 4B, and as previously discussed, the sharing of access via the storage interconnects 899ab, 899cd and 899yz to each of the sets of storage devices 800ab, 800cd and 800yz, respectively, among partnered ones of the nodes 300a-d and 300y-z may enable continued access to one of the sets of storage devices 800ab, 800cd and 800yz in the event of a failure occurring within one of the nodes 300a-d and 300y-z. The coupling of data modules 600 of partnered ones of the nodes 300a-d and 300y-z within each of the HA groups 1600ab, 1600cd and 1600yz via the HA interconnects 699ab, 699cd and 699yz, respectively, may enable such continued access in spite of such a failure. Through the HA interconnects 699ab, 699cd or 699yz, data modules 600 of each of these nodes may each monitor the status of the data modules 600 their partners. More specifically, the data modules 600 of the partnered nodes 300a and 300b may monitor each other through the HA interconnect 699ab, the data modules 600 of the partnered nodes 300c and 300d may monitor each other through the HA interconnect 699cd, and the data modules 600 of the partnered nodes 300y and 300z may monitor each other through the HA interconnect 699yz.

Such monitoring may entail recurring exchanges of "heartbeat" and/or other status signals (e.g., messages conveying the current state of performance of a data access command) via one or more of the HA interconnects 699ab, 699cd or 699yz in which an instance of an absence of receipt of such a signal within a specified recurring interval may be taken as an indication of a failure of the one of the data modules 600 from which the signal was expected. Alternatively or additionally, such monitoring may entail awaiting an indication from a monitored one of the data modules 600 that a failure of another component of one of the nodes 300a-d or 300y-z has occurred, such as a failure of a managing module 400 and/or of a network module 500 of that one of the nodes 300a-d or 300y-z. In response to such an indication of failure of an active one of the nodes 300a-d or 300y-z belonging to one of the HA groups 1600ab, 1600cd or 1600yz, an inactive partner among the nodes 300a-d or 300y-z of the same one of the HA groups 1600ab, 1600cd or 1600yz may take over. Such a "takeover" between partnered ones of the nodes 300a-d or 300y-z may be a complete takeover inasmuch as the partner that is taking over may take over performance of all of the functions that were performed by the failing one of these nodes.

However, in some embodiments, at least the network modules 500 and the data modules 600 of multiple ones of the nodes 300a-d and/or 300y-z may be interconnected in a manner enabling a partial takeover in response to the failure of a portion of one of the nodes 300a-d or 300y-z. Referring more specifically to FIG. 5A, the network modules 500 of each of the nodes 300a-d may be coupled to the data modules 600 of each of the nodes 300a-d via an intra-cluster interconnect 599a. In other words, within the cluster 1300a, all of the network modules 500 and all of the data modules 600 may be coupled to enable data access commands to be exchanged between network modules 500 and data modules 600 of different ones of the nodes 300a-d. Thus, by way of example, where the network module 500 of the node 300a has failed, but the data module 600 of the node 300a is still operable, the network module 500 of its partner node 300b (or of one of the nodes 300c or 300d with which the node 300a is not partnered in a HA group) may take over for the network module 500 of the node 300a.

Although the clusters 1300a and 1300z may be geographically distant from each other, within each of the clusters 1300a and 1300z, nodes and/or components of nodes may be positioned within relatively close physical proximity to each other such that the intra-cluster interconnects 599a and 599z may each traverse a relatively short distance (e.g., extending within a room and/or within a single cabinet). More broadly, one or more of the intra-cluster interconnects 599a and 599z may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599a may be made up of a mesh of point-to-point interconnects coupling each network module 500 of each of the nodes 300a-d to each data module 600 of each of the nodes 300a-d. Alternatively, by way of another example, the intra-cluster interconnect 599a may include a network switch (not shown) to which each of the network modules 500 and each of the data modules 600 of the nodes 300a-d may be coupled.

The managing module 400 of one or more of the active ones of the nodes 300a-d and 300y-z may recurringly retrieve indications of status from the network modules 500 and/or data modules 600 within the same node and/or from others of the nodes 300a-d and 300y-z. Where necessary, such a managing module 400 may indirectly retrieve such information from one or more network modules 500 and/or data modules 600 through one or more other managing modules 400. Among such retrieved indications may be indications of a failure in a network module 500 and/or a data module 600, and such a failure may have prompted a partial or a complete takeover by one of the nodes 300a-d and 300y-z of functions performed by another of the nodes 300a-d and 300y-z. Correspondingly, following a repair or other correction to address such a failure, the retrieved indications may include an indication of a "give-back" event in which a partial or complete takeover is reversed. In some embodiments, a managing module 400 that recurringly retrieves such indications of status may recurringly transmit those indications to the ingest server 2400 of the administration system 2000. Alternatively or additionally, that managing module 400 may generate a summary or other form of aggregation of such events as takeovers and give-backs to transmit to the ingest server 2400.

It should also be noted that despite the depiction of only a single one of each of the managing module 400, the network module 500 and the data module 600 within each of the nodes 300a-d and 300y-z, other embodiments are possible that may incorporate different quantities of one or more of the managing module 400, the network module 500 and the data module 600 within one or more of these nodes. By way of example, embodiments are possible in which one or more of the nodes 300a-d and/or 300y-z incorporate more than one network module 500 to provide a degree of fault-tolerance within a node for communications with one or more of the client devices 100, and/or incorporate more than one data module 600 to provide a degree of fault-tolerance within a node for accessing a corresponding one of the sets of storage devices 800ab, 800cd or 800yz.

Figure 5:
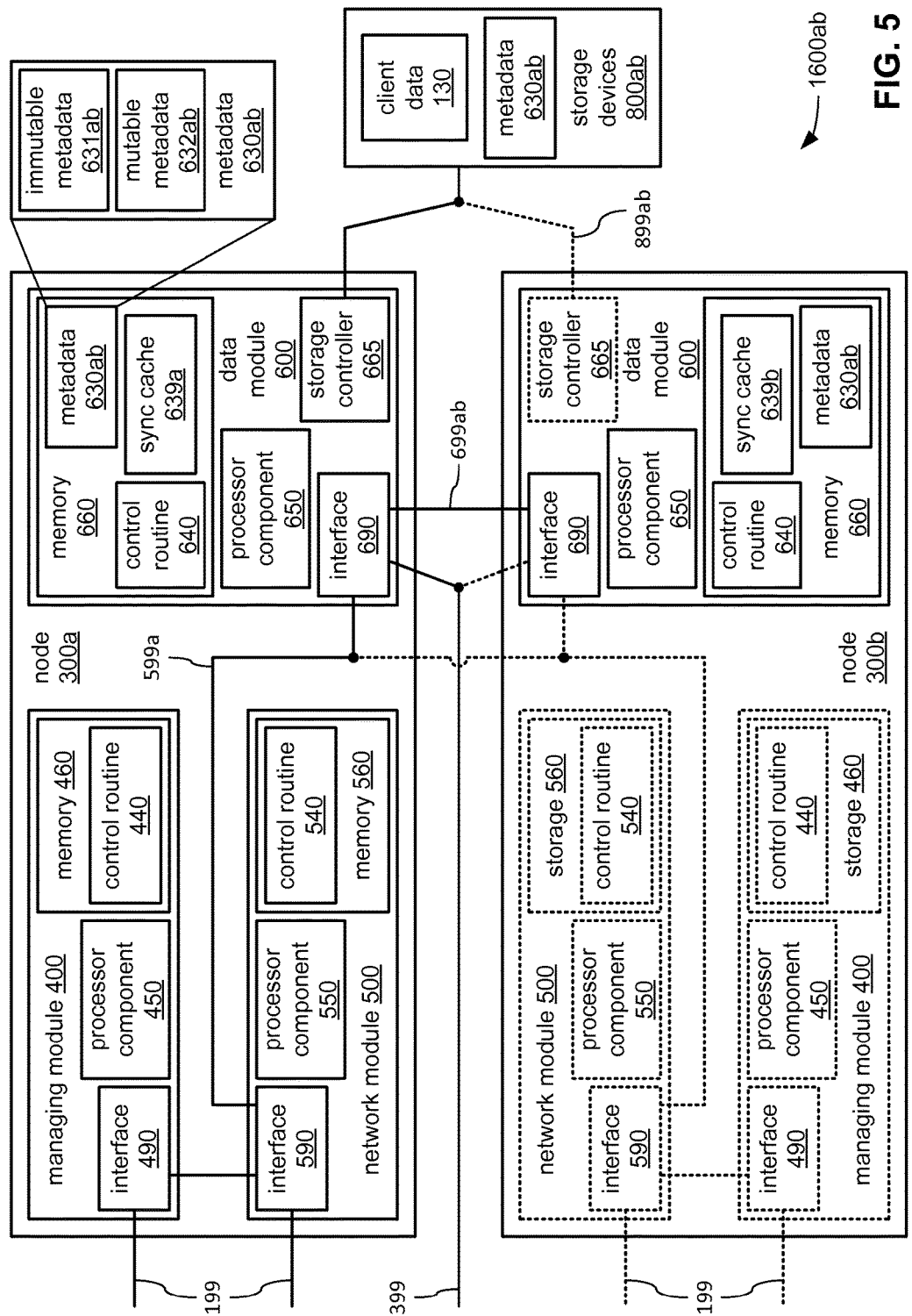
FIG. 5 illustrates an example embodiment of a HA group of partnered nodes.

FIG. 5 illustrates a block diagram of an example embodiment of the HA group 1600ab of the cluster 1300a of the embodiment of the storage cluster system 1000 of FIG. 3 in greater detail. As depicted, of the nodes 300a and 300b of the HA group 1600ab, the node 300a may be active to engage in communications with a client device 100 and/or the administration device 200, and may be active to perform operations altering the client data 130 within the set of storage devices 800ab, while the node 300b may be inactive and awaiting a need to take over for the node 300a. More specifically, the managing module 400 and the network module 500 of the node 300a may engage in communications with the client devices 100, the administration device 200 and/or the ingest server 2400 of the administration system 2000 (as indicated with the managing module 400 and the network module 500 of the node 300a being drawn with solid lines), while the managing module 400 and the network module 500 of the node 300b may not (as indicated with the managing module 400 and the network module 500 being drawn with dotted lines).

In various embodiments, the managing module 400 of each of the nodes 300a-b incorporates one or more of a processor component 450, a memory 460 and an interface 490 to couple the managing module 400 to at least the client interconnect 199. The memory 460 may store a control routine 440. The control routine 440 may incorporate a sequence of instructions operative on the processor component 450 in its role as a main processor component of the managing module 400 to implement logic to perform various functions. As a result of the node 300a being active to engage in communications with one or more of the client devices 100 and/or the administration device 200, the processor component 450 of the managing module 400 of the node 300a may be active to execute the control routine 440. In contrast, as a result of the node 300b being inactive, the processor component 450 may not be active to execute the control routine 440 within the managing module 400 of the node 300b. However, if the node 300b takes over for the node 300a, then the control routine 440 within the node 300b may begin to be executed, while the control routine 440 within the node 300a may cease to be executed.

In executing the control routine 440, the processor component 450 of the managing module 400 of the active node 300a may operate the interface 490 to accept remotely supplied configuration data. In some embodiments, such remote configuration data may emanate from the administration device 200. By way of example, which one(s) of the nodes 300b-d or 300y-z may be partnered to form one or more HA groups (e.g., the HA groups 1600ab, 1600cd or 1600yz) may be remotely configured, as well as what nodes and/or HA groups may cooperate to provide further fault tolerance (e.g., geographically dispersed fault tolerance), what network addresses may be allocated to one or more of the nodes 300a-d and/or 300y-z on various interconnects, etc. In other embodiments, such remote configuration may emanate from one or more of the client devices 100. The processor component 450 may provide a web server, telnet access, instant messaging and/or other communications service(s) by which such aspects of operation may be remotely configured from the administration device 200 or one or more of the client devices 100 via the client interconnect 199. Regardless of the exact manner in which configuration information is remotely provided, as the processor component 450 receives such configuration information and/or subsequent to receiving such information, the processor component 450 may operate the interface 490 to relay it and/or updates thereto to the network module 500 and/or the data module 600 as a portion of metadata. Alternatively or additionally, the processor component 450 may also operate the interface 490 to relay such configuration information and/or updates thereto to the ingest server 2400 of the administration system 2000.

In various embodiments, the network module 500 of each of the nodes 300a-b incorporates one or more of a processor component 550, a memory 560 and an interface 590 to couple the network module 500 to one or both of the client interconnect 199 and the intra-cluster interconnect 599a. The memory 560 may store a control routine 540. The control routine 540 may incorporate a sequence of instructions operative on the processor component 550 in its role as a main processor component of the network module 500 to implement logic to perform various functions. As a result of the node 300a being active to engage in communications with one or more of the client devices 100 and to perform data access commands, the processor component 550 of the network module 500 of the node 300a may be active to execute the control routine 540. In contrast, as a result of the node 300b being inactive, the processor component 550 may not be active to execute the control routine 540 within the N-module of the node 300b. However, if the node 300b takes over for the node 300a, then the control routine 540 within the node 300b may begin to be executed, while the control routine 540 within the node 300a may cease to be executed.

In executing the control routine 540, the processor component 550 of the network module 500 of the active node 300a may operate the interface 590 to perform various tests to detect other devices with which to communicate and/or assign network addresses by which other devices may be contacted for communication. At least as part of rebooting following being reset or powered on, the processor component 550 may perform various tests on the client interconnect 199 and/or the intra-cluster interconnect 599a to determine addresses and/or communications protocols for communicating with one or more components (e.g., managing modules 400, network modules 500 and/or data modules 600) of one or more of the nodes 300a-d and/or 300y-z. Alternatively or additionally, in embodiments in which at least a portion of the intra-cluster interconnect 599a supports internet protocol (IP) addressing, the processor component 550 may function in the role of a dynamic host control protocol (DHCP) server to assign such addresses. Also alternatively or additionally, the processor component 550 may receive configuration information from the managing module 400 (e.g., a portion of metadata). In some embodiments, configuration information received from the managing module 400 may be employed by the processor component 550 in performing such tests on the client interconnect 199 and/or the intra-cluster interconnect 599a (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the data module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the data module 600 as portions of updated metadata.

In some embodiments, as the processor component 550 of each network module 500 that performs such tests, those processor components 550 may also operate their respective interfaces 590 to relay the results of those tests and/or updates thereto to the managing module 400 that is in communication with the ingest server 2400, either directly thereto, or through another intervening managing module 400. The managing module 400 in communication with the ingest server 2400 may also transmit a copy of the portions of metadata as originally generated and as updated by the results of those tests. Differences in the portions of metadata preceding and following such updates may provide an indication to be stored by the ingest server 2400 of an attempt to configure the storage cluster system 1000 that is being defeated by a condition affecting a portion of an interconnect and/or another factor.

In further executing the control routine 540, the processor component 550 may operate the interface 590 to exchange storage service requests, responses thereto and/or client data 130 with one or more of the client devices 100 via the client interconnect 199. The client devices 100 and the network module(s) 500 of one or more active ones of the nodes 300a-d and 300y-z may interact with each other via the client interconnect 199 in accordance with a client/server model for the handling of client data 130. Stated differently, each of the client devices 100 may issue requests for storage services related to the storage of client data 130 to one or more of the nodes 300a-d and 300y-z that are active to engage in communications with the client devices 100. In so doing, the client devices 100 and the network module 500 may exchange packets over the client interconnect 199 in which storage service requests may be transmitted to the network module 500, responses (e.g., indications of status of handling of the requests) may be transmitted to the client devices 100, and client data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client data 130, with the data module 600 via the intra-cluster interconnect 599a. Such exchanges of commands and/or data may or may not employ a protocol in which packets are used. In some embodiments, data access commands to effect exchanges of client data 130 may be exchanged through the intra-cluster interconnect 599a in a manner that may be agnostic of any particular file system that may be selected for use in storing the client data 130 within the set of storage devices 800ab. More specifically, the manner in which portions of client data 130 may be referred to in data access commands to store and/or retrieve client data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the data module 600 via the intra-cluster interconnect 599a. Alternatively or additionally, one or more of the protocols employed in communications via the client interconnect 199 may employ file and/or block identification in a manner enabling a minimal degree of protocol translation between such communications and communications via the intra-cluster interconnect 599a.

In performing such protocol translations, the processor component 550 may be caused to relay a storage service request from one of the client devices 100 to the data module 600 as one or more data access commands to store and/or retrieve client data 130. More specifically, a request received via the client interconnect 199 for storage services to retrieve client data 130 may be converted into one or more data access commands conveyed to the data module 600 via the intra-cluster interconnect 599a to retrieve client data 130 from the set of storage devices 800ab and to provide the client data 130 to the network module 500 to be relayed by the network module 500 back to the requesting one of the client devices 100. Also, a request received via the client interconnect 199 for storage services to store client data 130 may be converted into one or more data access commands conveyed to the data module 600 via the intra-cluster interconnect 599a to store the client data 130 within the set of storage devices 800ab.

In various embodiments, the data module 600 of each of the nodes 300a-b incorporates one or more of a processor component 650, a memory 660, a storage controller 665 to couple the data module 600 to the set of storage devices 800ab via the storage interconnect 899ab, and an interface 690 to couple the data module 600 to one or more of the intra-cluster interconnect 599a, the inter-cluster interconnect 399 and the HA interconnect 699ab. The memory 660 stores one or more of a control routine 640 and metadata 630ab. Also, and as will be explained in greater detail, in the data module 600 of the node 300a, a portion of the memory 660 may be allocated to serve as a synchronization cache (sync cache) 639a, while a portion of the memory 660 may be similarly allocated to serve as a sync cache 639b in the data module 600 of the node 300b. The control routine 640 incorporates a sequence of instructions operative on the processor component 650 in its role as a main processor component of the data module 600 to implement logic to perform various functions. However, as a result of the node 300a being active to engage in communications with one or more of the client devices 100 and to perform data access commands, a different portion of the control routine 640 may be executed by the processor component 650 of the data module 600 of the node 300a from a portion of the control routine 640 that may be executed by the processor component 650 of the data module 600 of the node 300b. As a result, different logic may be implemented by the executions of different portions of the control routine 640 within each of these data modules 600.

In executing the control routine 640, the processor component 650 of the data module 600 of the active node 300a may operate the interface 690 to receive portions of metadata and/or updates thereto from the managing module 400 and/or the network module 500 via the intra-cluster interconnect 599a. Regardless of whether aspects of the operation of at least the node 300a are remotely configured via the managing module 400 and/or are configured based on the results of tests performed by the network module 500, the processor component 650 may generate the metadata 630ab from those received metadata portions indicating the resulting configuration of those aspects, and may store the metadata 630ab within the memory 660 for subsequent use by the processor component 650. The processor component 650 may repeat the generation of the metadata 630ab in response to receiving updated portion(s) of metadata from the managing module 400, the network module 500 and/or other possible sources of updated metadata portions, thereby creating an updated version of the metadata 630ab which the processor component 650 may store within the memory 660 in place of earlier version(s). Following generation of the metadata 630ab and/or each updated version thereof, the processor component 650 may store the metadata 630ab within the set of storage devices 800ab for later retrieval during a subsequent rebooting of at least the data module 600 of the node 300a.

Also following generation of the metadata 630ab and/or each updated version thereof, the processor component 650 of the data module 600 of the node 300a may operate the interface 690 to transmit a duplicate of the metadata 630ab to the data module 600 of the inactive node 300b via the HA interconnect 699ab to enable the node 300b to more speedily take over for the active node 300a in response to a failure within the node 300a. In this way, the node 300b is directly provided with the metadata 630ab and/or updated versions thereof to provide information needed by the node 300b to more readily take over communications with one or more client devices, take over communications with one or more others of the nodes 300c-d and/or 300y-z, and/or take over control of and/or access to the set of storage devices 800ab.

Still further following generation of the metadata 630ab and/or each updated version thereof, the processor component 650 of the data module 600 of the node 300a may operate the interface 690 to transmit a portion of the metadata 630ab to the data module 600 of an active one of the nodes 300y-z of the HA group 1600yz of the other cluster 1300z. Alternatively or additionally, the processor component 650 of the data module 600 of the node 300a may operate the interface 690 to transmit metadata portion(s) received from the managing module 400 and/or the network module 500 of the node 300a to the active one of the nodes 300y-z. Such metadata portion(s) may include indications of aspects of operation of all of the nodes 300a-b and 300y-z together in storing and/or providing access to the client data 130, and may be provided to the active one of the nodes 300y-z as an input to other metadata that may be separately generated and/or maintained by the nodes 300y-z.

In some embodiments, as the processor component 650 of at least the data module 600 receives metadata portions (or updates thereto) and generates each new version of the metadata 630ab, the processor component 650 may operate the interface 690 to relay each new version of the metadata 630ab to the managing module 400 that is in communication with the ingest server 2400 of the administration system 2000 through one or more network modules 500. As previously discussed, the managing module 400 in communication with the ingest server 2400 may also transmit a copies of the portions of metadata from which the metadata 630ab is derived, and in so doing, may transmit a copy of the metadata 630ab with those metadata portions.

In further executing the control routine 640, the processor component 650 of the data module 600 of the node 300a may operate the set of storage devices 800ab through the storage controller 665 to store and retrieve client data 130 in response to data access commands to do so received via the intra-cluster interconnect 599a, as has been described. The processor component 650 may operate the interface 690 to receive the data access commands from and/or exchange data (including client data 130) with the network module 500 via the intra-cluster interconnect 599a. The processor component 650 may be caused to retry the performance of a data access command to store or retrieve client data 130 at least in response to the occurrence of a short term failure in performance (e.g., a failure that is likely to be resolved relatively quickly). However, if the failure in performance is a longer term failure (e.g., a failure that cannot be resolved quickly and/or requires intervention of personnel), then a takeover may occur in which, for example, the node 300b becomes the new active node of the HA group 1600ab.

In addition to operating the storage controller 665 to execute data access commands to store client data 130 within the set of storage devices 800ab and/or retrieve client data 130 therefrom, the processor component 650 of the data module 600 of the node 300a may also replicate the data access commands and operate the interface 690 to transmit the resulting replica data access commands via the inter-cluster interconnect 399 to a data module 600 of an active one of the nodes 300y-z of the HA group 1600yz of the other cluster 1300z. As has been discussed, the transmission of such replica data access commands to an active node of another HA group may provide an additional degree of fault tolerance in the storage and/or retrieval of client data 130 in which the replica data access commands may be performed by an active node of another cluster at least partly in parallel with the performance of the original data access command by the node 300a. The processor component 650 may be caused to retry the transmission of such replica data access commands to either the same active one of the nodes 300y-z within the HA group 1600yz and/or to a different inactive one of the nodes 300y-z within the HA group 1600yz in response to indications of errors in either the receipt or performance of the replica data access commands. Retrying transmission of replica data access commands to an inactive one of the nodes 300y-z may cause or arise from a takeover of the active one of the nodes 300y-z by the inactive one thereof.

In support of such exchanges of replica data access commands and responses thereto between the data module 600 of the node 300a and a data module 600 of an active one of the nodes 300y-z, the processor component 650 of the data module 600 of the node 300a may employ information included within the metadata 630ab to form an active communications session with the data module 600 of that other active node through the inter-cluster interconnect 399. The processor component 650 may additionally form an inactive communications session with a data module 600 of the inactive one of the nodes 300y-z through the inter-cluster interconnect 399 in preparation for retrying a transmission of a replica data access command to the data module 600 of that inactive node. Further, if the processor component 650 retries the transmission of a replica data access command to the data module 600 of that inactive one node, then the processor component 650 may act to change the state of the inactive communications session formed with the data module 600 of that inactive node from inactive to active.

In executing the control routine 640, the processor component 650 of the data module 600 of the inactive node 300b may operate the interface 690 to receive the metadata 630*ab* and/or updates thereto from the data module 600 of the node 300*a* via the HA interconnect 699*ab*. The processor component 650 may then store the received metadata 630*ab* and/or the received updates thereto within the memory 660 for subsequent use. Again, provision of the metadata 630*ab* and updates thereto directly to the node 300*b* by the node 300*a* may be deemed desirable to enable the node 300*b* to more quickly take over for the node 300*a* (thereby transitioning from being an inactive node of the HA group 1600*ab* to becoming the active node of the HA group 1600*ab*) in response to a failure occurring within the node 300*a*. More specifically, with the metadata 630*ab* already provided to the data module 600 of the node 300*b*, the need for the processor component 650 of the data module 600 of the node 300*b* to take additional time to retrieve the metadata 630*ab* from other sources is alleviated. More precisely, the need for the processor component to retrieve the metadata 630*ab* from the set of storage devices 800*ab*, or to request portions of metadata from the managing module 400 and/or the network module 500 of either of the nodes 300*a* or 300*b* upon taking over for the node 300*a* is alleviated.

As depicted, the metadata 630*ab* may include immutable metadata 631*ab* and mutable metadata 632*ab*. What pieces of metadata are included in each of the immutable metadata 631*ab* and the mutable metadata 632*ab* may be based on the relative frequency with which each piece of metadata is expected to change. By way of example, aspects of the storage of client data 130 within the set of storage devices 800*ab*, such as a selection of file system, a "level" of redundancy of a Redundant Array of Independent Disks (RAID), etc. may be deemed immutable as a result of being deemed less likely to change or likely to change less frequently than other metadata. In contrast, a network address of a M-module, a N-module or a D-module of one of the other nodes 300*a-d* or 300*y-z* with which the node 300*a* may communicate via one of the interconnects 399, 599*a* or 699*ab* may be deemed mutable as a result of being deemed more likely to change or likely to change more frequently than other metadata.

As part of determining whether one of the nodes 300*a* or 300*b* needs to take over for the other, the processor components 650 of the D-modules of each of the nodes 300*a* and 300*b* may cooperate to recurringly exchange indications of the status of their nodes via the HA interconnect 699*ab* extending therebetween. As previously discussed such exchanges of status indications may take the form of recurring "heartbeat" signals and/or indications of the current state of performing an operation (e.g., a performing a data access command). Again, an indication that a component of one of the nodes 300*a-b* has suffered a malfunction may be the lack of receipt of an expected heartbeat signal or other status indication by the other of the nodes 300*a-b* within a specified period of time (e.g., within a recurring interval of time). Where the data module 600 of the active node 300*a* receives an indication of a failure within the inactive node 300*b*, the processor component 650 of the data module 600 of the node 300*a* (or another component of the node 300*a*) may refrain from taking action to take over the node 300*b*, since the node 300*b* is inactive such that the node 300*b* may not be performing a task that requires a takeover of the node 300*b*.

However, where the data module 600 of the inactive node 300*b* receives an indication of a failure within the active node 300*a*, the processor component 650 of the data module 600 of the inactive node 300*b* (or another component of the inactive node 300*b*) may take action to take over the node 300*a*, since the node 300*a* is active to engage in communications with the client devices 100, to perform data access commands, and to cooperate with another active node to cause at least partial parallel performance of data access commands therebetween. By way of example, the processor component 650 of the data module 600 of the node 300*b* may signal the network module 500 of the node 300*b* to take over communications with one or more of the client devices 100 and/or may begin performing the data access commands that were performed by the processor component 650 of the data module 600 of the node 300*a*. In taking over the performance of those data access commands, the processor component 650 of the data module 600 of the node 300*b* may take over access to and control of the set of storage devices 800*ab* via the coupling that the data modules 600 of both of the nodes 300*a* and 300*b* share to the set of storage devices 800*ab* through the storage interconnect 899*ab*.

Where the inactive node 300*b* does take over for the active node 300*a* in response to a failure occurring within the node 300*a*, the active and inactive roles of the nodes 300*a* and 300*b* may fully reverse, at least after the failure within the node 300*a* has been corrected. More specifically, the managing module 400 and the network module 500 of the node 300*b* may become active to engage in communications with the client devices 100 and/or the administration device 200 via the client interconnect 199 to receive configuration information and storage service requests, and thereby take over for the managing module 400 and the network module 500 of the node 300*a*, while the managing module 400 and the network module 500 of the node 300*a* become inactive. Similarly, the data module 600 of the node 300*b* may become active to perform and replicate data access commands, and to transmit replica data access commands to another active node via the inter-cluster interconnect 399 to cause at least partial parallel performance of the data access commands, and thereby take over for the data module 600 of the node 300*a*, while the data module 600 of the node 300*a* becomes inactive. However, in becoming active, the processor component 650 of the data module 600 of the now inactive node 300*a* may cooperate with the processor component 650 of the data module 600 of the node 300*b* to receive new versions of the metadata 630*ab* generated within the node 300*b* and to exchange indications of status with the data module 600 of the node 300*b* via the HA interconnect 699*ab* to determine if the node 300*a* should subsequently take over for the now active node 300*b*.

The processor components 650 of the data modules 600 of each of the nodes 300*a* and 300*b* may designate or otherwise use a portion of corresponding ones of the memories 660 as the sync caches 639*a* and 639*b*, respectively, in communications with data module(s) 600 of others of the nodes 300*a-d* and/or 300*y-z*. More specifically, the processor components 650 of the data modules 600 of the nodes 300*a* and 300*b* may employ the sync caches 639*a* and 639*b*, respectively, to buffer versions of the metadata 630*ab* and/or status indications exchanged therebetween. Alternatively or additionally, the processor component 650 of the data module 600 of the node 300*a* may maintain and employ the sync cache 639*a* to buffer replica data access commands transmitted to another active node of another HA pair of another cluster and/or indications of status of performance of those replica data access commands received from that other active node.

As the processor components 550 of network modules 500 and the processor components 650 of data modules 600 within active ones of the nodes 300*a-d* and 300*y-z* execute relevant portions of the control routines 540 and 640, respectively, to handle requests for storages services received from one or more of the client devices 100, each of those processor components 550 and 650 may monitor various aspects of the performance and usage of the storage cluster system 1000. By way of example, each of such processor components 550 may monitor the rates at which requests for storage services are received and relayed, the amount of time required to do so, the rate of throughput of client data 130 exchanged through active ones of the network modules 500, and any instances in which a specified maximum or other high rate of throughput of client data 130 is reached or exceeded. Also by way of example, each of such processor components 650 may monitor the quantities of client data 130 stored within and/or amounts of storage capacity still available within associated ones of the sets of storage devices 800ab, 800cd and/or 800yz, data rates at which client data 130 is stored or retrieved, and any instances in which an access to one or more storage devices needed to be retried. Such processor components 550 and 650 may operate corresponding ones of the interfaces 590 and 690, respectively, to relay such information to the managing module 400 that is in communication with the ingest server 2400, either directly thereto or through another intervening Managing module 400. The one of the managing modules 400 in communication with the ingest server 2400 may, in turn, relay such information to the ingest server 2400.

Figure 6:
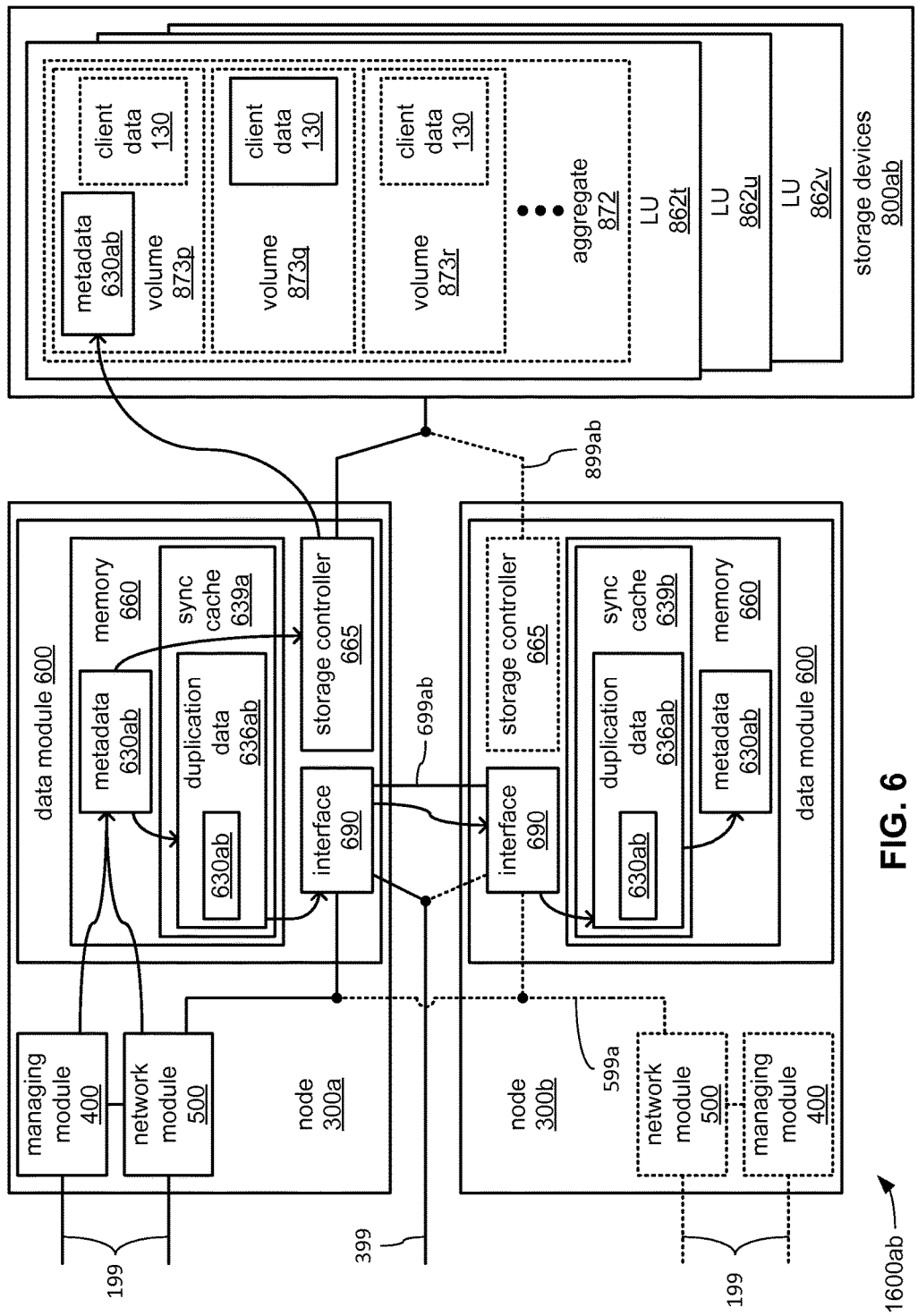
FIG. 6 illustrates an example embodiment of duplication and storage of metadata within a shared set of storage devices.

FIG. 6 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and/or the administration device 200, and/or may be active to perform operations altering the client data 130 within the set of storage devices 800ab, while the node 300b may be inactive and awaiting a need to take over for the node 300a. FIG. 6 also depicts various aspects of the generation, duplication and storage of the metadata 630ab within the set of storage devices 800ab alongside the client data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. As depicted, the set of storage devices 800ab may include LUs 862t-v that may be operated together to form an array of storage devices. In some embodiments, the processor component 650 of the data module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client data 130 into separate categories based on subject, as part of separating client data 130 into different versions generated over time, as part of implementing differing access policies to different pieces of client data 130, etc. In some embodiments, and as depicted, the storage space provided by within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630ab.

The client data 130 may be stored entirely within one of the volumes 873p-r, or may be distributed among multiple ones of the volumes 873p-r (as depicted). As also depicted, the metadata 630ab may also be stored within the set of storage devices 800ab along with client data 130, at least within the same aggregate 872. In some embodiments, the metadata 630ab may be stored within one or more of the same volumes 873p-r as client data 130 (as depicted). In other embodiments, the metadata 630ab may be stored within one of the volumes 873p-r that is separate from one or more others of the volumes 873p-r within which client data 130 may be stored. The manner in which the metadata 630ab and/or the client data 130 are to be organized within aggregates and/or values may be specified within the metadata 630ab itself.

As previously discussed, the managing module 400 of the active node 300a may provide portions of metadata, including updates thereof, to the network module 500 and/or the data module 600 in response to receiving configuration information from one of the client devices 100. Again, such portions of metadata so provided by the managing module 400 (and/or updates thereto) may include configuration information received in configuration data from the administration device 200 and/or one or more of the client devices 100. Also, the network module 500 of the active node 300a may provide portions of metadata, including updates thereof, to the data module 600 that indicate results of various tests performed by the network module 500. Again, the portions of metadata so provided by the network module 500 (and/or updates thereto) may include configuration information derived by the network module 500 through the performance of various tests. And again, a duplicate of the metadata 630ab may be generated and stored within the sync cache 639a as a portion of duplication data 636ab, by which the duplicate of the metadata 630ab may be transmitted via the interface 690 and the HA interconnect 699ab to the data module 600 of the inactive node 300b.

As the processor component 650 of the data module 600 of one or more of the active nodes 300a-d and 300y-z are caused to create aggregates and/or volumes in corresponding ones of the sets of storage devices 800ab, 800cd and 800yz, those processor components 650 may monitor the process of doing so and record various results of those processes, such as failures in particular storage devices, instances of needing to resize one aggregate or volume to accommodate an expansion of another, and instances of automatically increasing the size of a volume or aggregate as a result of the storage of a larger quantity of client data 130 than could be accommodated by the original defined capacity of that volume or aggregate. Again, those ones of the processor component 650 may operate corresponding ones of the interfaces 690 to relay such information to the one of the managing modules 400 that is in communication with the ingest server 2400 to be relayed thereto.

Figure 7:
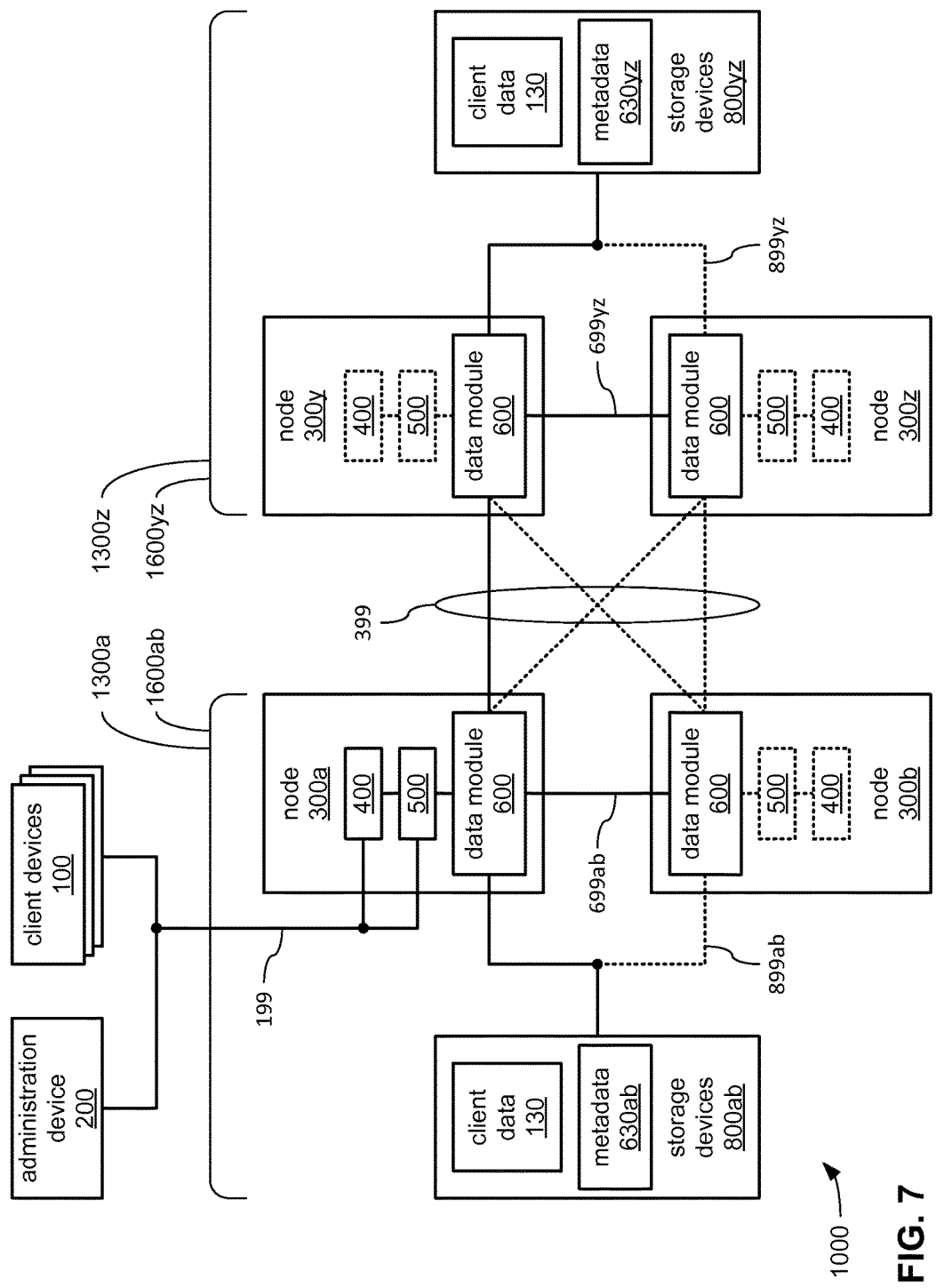
FIG. 7 illustrates an example embodiment of a mesh of communications sessions among nodes.

FIG. 7 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the network module 500 of the node 300a, the data module 600 of the node 300a may both begin performance of the data access command and transmit a replica of that data access command to the node 300y via the active communications session formed through inter-cluster interconnect 399 between the nodes 300a and 300y. The data module 600 of the node 300y may then perform the replica data access command at least partly in parallel with the performance of the data access command by the data module 600 of the node 300a.

In preparation for such a transmission, the data module 600 of the node 300a may cooperate with the data module 600 of the node 300y to form the depicted active communications session between the nodes 300a to 300y through an exchange of messages requesting and accepting formation of the active communications session. Following its formation, the data modules 600 of the nodes 300a and 300y may cooperate to maintain the active communications session by recurring exchanges of test signals (e.g., test messages) therethrough to monitor the state of the active communications session.

In addition to the data modules 600 of the nodes 300a and 300y cooperating to form and maintain the depicted active communications session through the inter-cluster interconnect 399 to support such exchanges of replica data access commands, the data modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, test signals (e.g., test messages) may be exchanged through one or more of the inactive communications sessions to monitor their state.

In the event of a failure of at least a portion of the node 300a, the node 300b may take over for the node 300a, and in so doing, may change the state of the inactive communications session extending between the data modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the data modules 600 of the nodes 300a and 300z into an active communications session. By doing so, the node 300z becomes able to receive and perform replica data access commands from the node 300a in place of the node 300y. In either of these events, the active communications session extending between the D-modules of the nodes 300a and 300y may become inactive. In some embodiments, indications of such changes in which communication sessions are active and/or inactive may be relayed to the one of the managing modules 400 that is in communication with the ingest server 2400 to enable those indications to be relayed onward to the ingest server 2400 alongside indications of which communication sessions were originally configured to be active, at least by default.

Figure 8A:
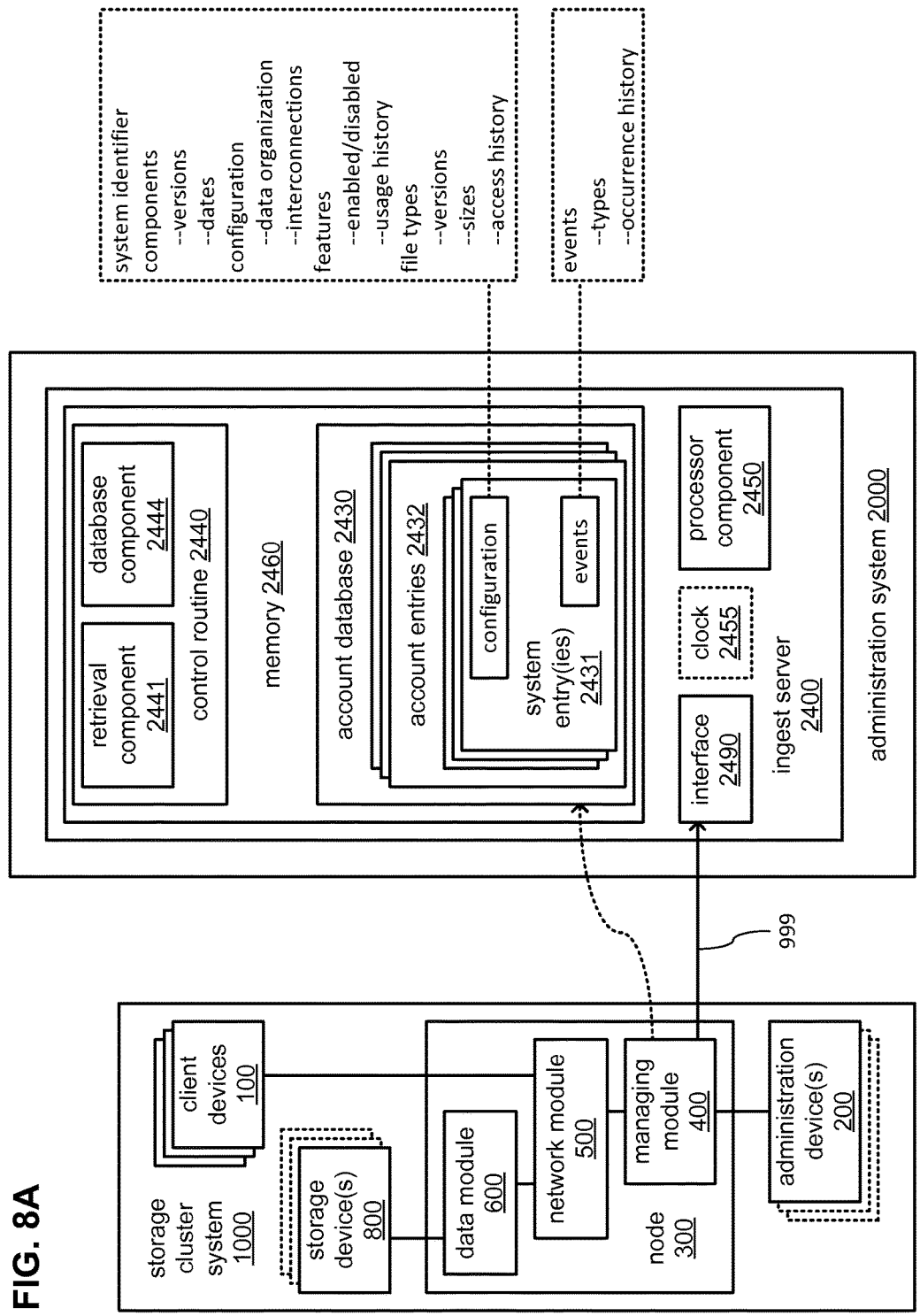
FIG. 8A illustrates an example embodiment of an ingest server of an administration system.
Figure 8B:
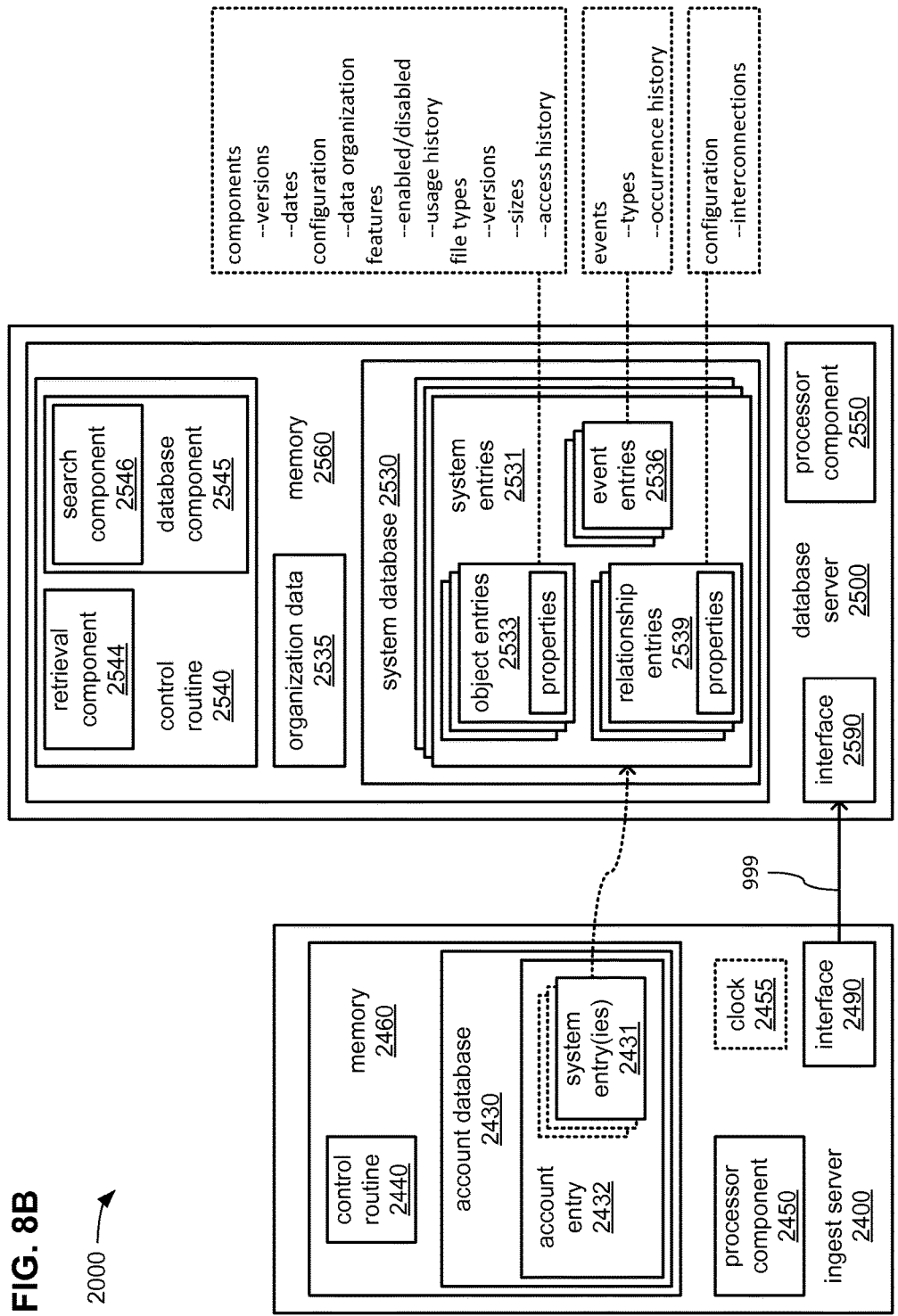
FIG. 8B illustrates an example embodiment of a database server of an administration system.
Figure 8C:
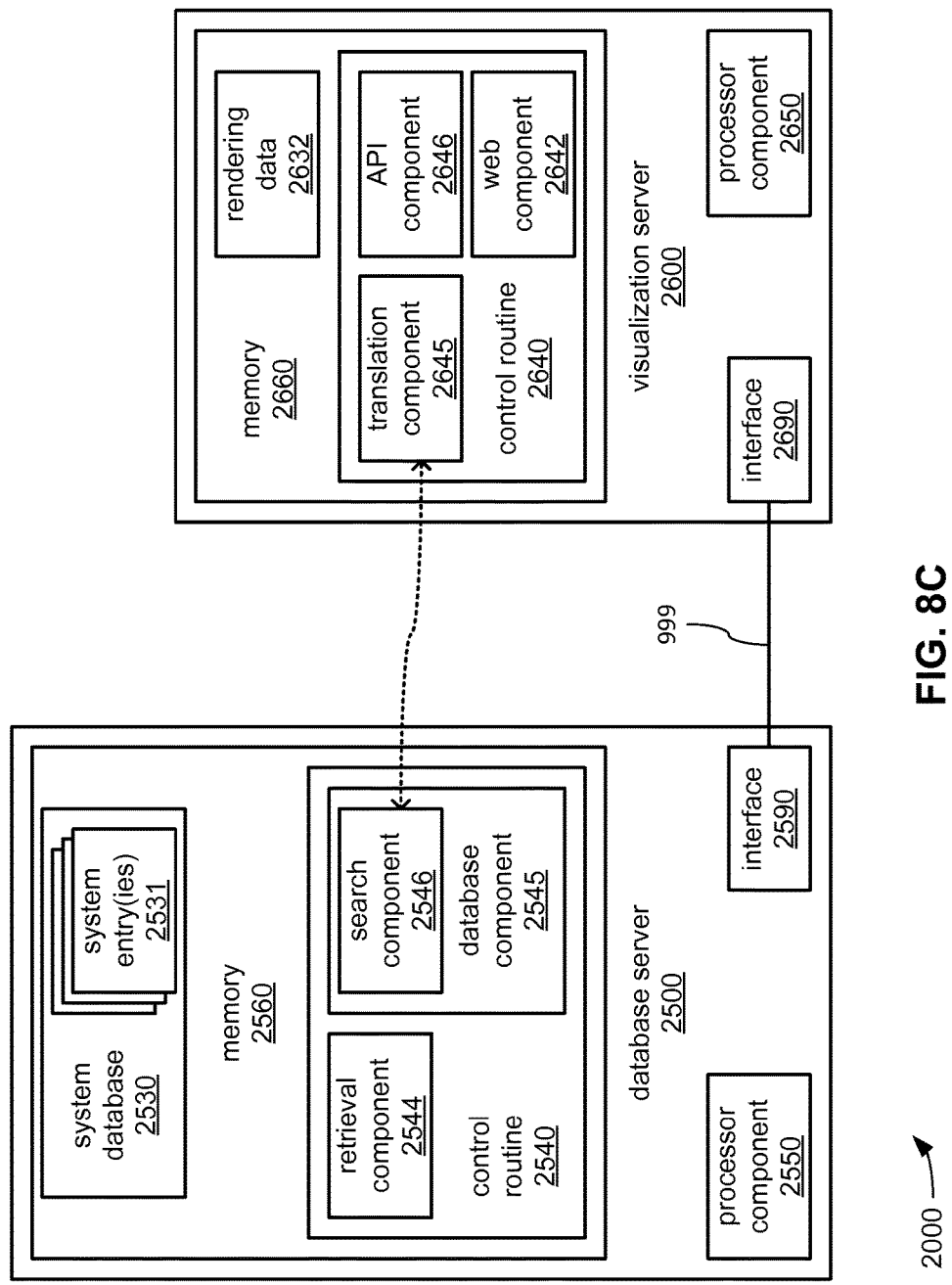
FIG. 8C illustrates an example embodiment of a visualization server of an administration system.
Figure 8D:
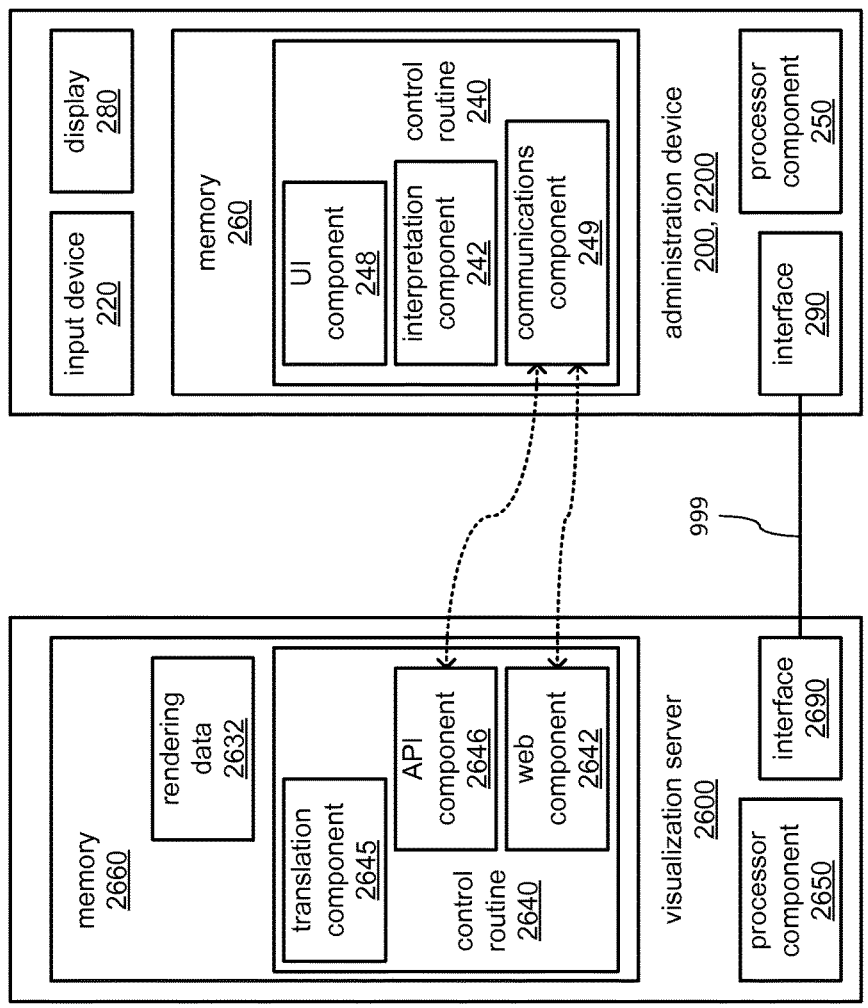
FIG. 8D illustrates an example embodiment of an administration device of an administration system.

FIGS. 8A-D each illustrate a block diagram of a portion of an embodiment of the administration system 2000 of FIG. 1 in greater detail. More specifically, FIG. 8A depicts aspects of the operating environment of an example embodiment of the ingest server 2400, FIG. 8B depicts aspects of the operating environment of an example embodiment of the database server 2500, FIG. 8C depicts aspects of the operating environment of an example embodiment of the visualization server 2600, and FIG. 8D depicts aspects of the operating environment of an example embodiment of one of the administration devices 200 or 2200.

Turning to FIG. 8A, in various embodiments, the ingest server 2400 incorporates one or more of a processor component 2450, a clock 2455, a memory 2460 and an interface 2490 to couple the ingest server 2400 to at least the network 999. The memory 2460 may store the account database 2430 and a control routine 2440. The account database 2430 may be made up of numerous ones of the account entries 2432, and each of the account entries 2432 may include one or more system entries 2431. The control routine 2440 may incorporate a sequence of instructions operative on the processor component 2450 in its role as a main processor component of the ingest server 2400 to implement logic to perform various functions during execution of the control routine 2440 by the processor component 2450.

As depicted, the control routine 2440 may incorporate a retrieval component 2441 executable by the processor component 2450 to operate the interface 2490 to receive information concerning the configuration and operating aspects of the one or more storage cluster systems 1000 from at least one node 300 of each. As depicted, it may be the managing module 400 of the at least one node 300 of each of the storage cluster systems 1000 that transmits the information concerning configuration and aspects of operation. As previously discussed, each of the storage cluster systems 1000 may vary greatly in complexity from relatively simple embodiments that incorporate as little as a single node 300 and a single storage device 800, to relatively complex embodiments that incorporate multiple nodes 300 and numerous storage devices 800 coupled and configured to provide multiple forms of fault tolerance.

The retrieval component 2441 may operate the interface 2490 to recurringly contact the at least one node 300 of one or more of the storage cluster systems 1000 via the network 999 to poll for such information on what may be a regular interval. Alternatively or additionally, the retrieval component 2441 may operate the interface 2490 to await transmission of such information to the ingest server 2400 by one or more of the storage cluster systems 1000. Again, one or more of the storage cluster systems 1000 may transmit such information to the ingest server 2400 at a recurring interval of time and/or in response to the occurrence of one or more particular events as part of providing the ingest server 2400 with a record thereof for subsequent diagnostics. As such information is recurringly received, the retrieval component 2544 may employ indications of the current time and/or the current date maintained by the clock 2455 to timestamp pieces of the received information to indicate the time and/or date at which each such piece is received.

The information so collected from each of the storage cluster systems 1000 may include indications of various aspects of the hardware and/or software components that make up each of the storage cluster systems 1000, such as versions of those components and/or dates of manufacture of those components. Such information may include indications of the manner in which various aspects of each of the storage cluster systems 1000 are configured, such as the manner in which various hardware components thereof are coupled and/or the manner in which client data and/or other data are organized as stored within one or more of the storage devices 800. Such information may include indications of features of each of the storage cluster systems 1000 that are enabled and/or disabled, as well as features of individual hardware and/or software components, and as well as indications of the manner in which one or more of those features are configured. Such information may include indications of what applications software is used with each of the storage cluster systems 1000, including versions of those applications, histories of changes in what applications are used, and/or histories of the pattern and/or degree of usage of each of those applications. Such information may include indications of the kind of client data stored within one or more of the storage devices 800 of each of the storage cluster systems 1000, including types of data files, versions of the file types that are used, the sizes of various types of data files, and/or the pattern and/or frequency of accesses made to various types of data files. Such information may include indications of occurrences of various events within or otherwise involving each of the storage cluster systems 1000, including types of events (e.g., malfunctions, instances of exceeding storage capacity, resizing of volumes, additions and/or removals of storage devices 800, etc.), the outcomes of various events, and/or the pattern and/or frequency of occurrence of various types of events. Such information may include identities and/or contact information for one or more administrators associated with an operator of one or more of the storage cluster systems 1000 (e.g., a network address of one of the administration devices 200 that is associated with one or more of those administrators).

As also depicted, the control routine 2440 may incorporate a database component 2444 executable by the processor component 2450 to organize and store such information as is received from the at least one node 300 of each of the storage cluster systems 1000 in the account database 2430. As previously discussed, the account database 2430 may be divided into multiple account entries 2432 with each of the account entries 2432 storing all of such information received from one or more storage cluster systems 1000 that are operated by a single storage cluster system operator. As also previously discussed, where a single storage cluster system operator operates multiple ones of the storage cluster systems 1000, the information received from each may be stored in separate system entries 2431 defined within the account entry 2432 associated with that storage cluster system operator. Within each of system entries 2431, information may be organized chronologically.

Thus, upon the retrieval by the retrieval component 2441 of information concerning a particular storage cluster system 1000 may be time stamped by the retrieval component 2441, and then stored within the one of the system entries 2431 that corresponds to the particular storage cluster system 1000 and that is maintained as part of the account entry 2432 corresponding to the operator of that particular storage cluster system 1000. Further, each new piece of information concerning that particular storage cluster system 1000 may be chronologically organized within that one of the system entries 2431 by the timestamp that may have been given to it by the retrieval component 2441 indicating when it was received and/or by an indication within that piece of information of when an event involving that particular storage cluster system 1000 is indicated within that piece of information to have occurred.

The information received by the ingest server 2400 may be a combination of metadata (e.g., the example metadata 630ab), configuration data on which metadata may be based and/or data indicating the details of an event occurring within a storage cluster system 1000. In some embodiments, the retrieval component 2441 may timestamp the time and/or date at which each such piece of data is received by the ingest server 2400 and the database component 2444 store each such piece of data within an appropriate one of the system entries 2431 with little in the way of interpretation or modification.

In some embodiments, it may be the arrival of metadata and/or configuration data associated with a storage cluster system 1000 from which no data has previously been received that may trigger the generation of a new system entry 2431, either within an existing account entry 2432 if such a new storage cluster system 1000 is operated by a known operator or within a new account entry 2432 generated to store the new system entry 2431 if the operator of the new storage cluster system 1000 is also new. Following the generation of a least a new system entry 2431 for a new storage cluster system 1000, pieces of data that are subsequently received that indicate the occurrence of events within that new storage cluster system 1000 may then be stored within that new system entry 2431.

In some embodiments, changes to the configuration of a storage cluster system 1000 that entail the addition or removal of one or more components may be conveyed to the ingest server 2400 by the receipt of new metadata and/or configuration data that is intended to replace or otherwise override earlier received metadata and/or configuration data. In some embodiments, the database component 2444 may compare the contents of more recently received metadata and/or configuration data to earlier received pieces of such data to identify configuration changes that may have taken place in a storage cluster system 1000. Alternatively or additionally, such changes made in a storage cluster system 1000 may be indicated as events in much the same manner as failure events and still other types of events in pieces of data received by the ingest server 2400 that convey the details of events.

Turning to FIG. 8B, in various embodiments, the database server 2500 incorporates one or more of a processor component 2550, a memory 2560 and an interface 2590 to couple the database server 2500 to at least the network 999. The memory 2560 may store the system database 2530, organizational data 2535 and a control routine 2540. The system database 2530 may be made up of numerous ones of the system entries 2531, and each of the system entries 2531 may include multiple object entries 2533, event entries 2536 and/or relationship entries 2539. The control routine 2540 may incorporate a sequence of instructions operative on the processor component 2550 in its role as a main processor component of the database server 2500 to implement logic to perform various functions during execution of the control routine 2540 by the processor component 2550.

As depicted, the control routine 2540 may incorporate a retrieval component 2544 executable by the processor component 2550 to operate the interface 2590 to recurringly access the account entries 2432 of the account database 2430 maintained by the ingest server 2400. The retrieval component 2544 may operate the interface 2590 to recurringly contact the ingest server 2400 via the network 999 to poll for the contents of each of the account entries 2432 on what may be a regular interval. Alternatively or additionally, the retrieval component 2544 may operate the interface 2590 to await transmission of the contents of each of the account entries 2432 by the ingest server 2400, which may transmit such contents to the database server 2500 at a recurring interval of time and/or in response to the occurrence of one or more particular changes to the contents of one of the account entries 2432.

As also depicted, the control routine 2540 may incorporate a database component 2545 executable by the processor component 2550 to generate and maintain the system entries 2531 of the system database 2530. As previously discussed, within each system entry 2531, each of various components of a storage cluster system 1000 may be represented as an object in which various details of its operation and/or its interactions with other components within a storage cluster system 1000 may be represented as properties of that object. As part of instantiating such an object, the database component 2545 may allocate a portion of the memory 2560 in which to create an object entry 2533 made up of one or more data structures in which is stored indications of various details of the component for which the object is instantiated.

In instantiating objects for each of various components of a storage cluster system, the database component 2545 may refer to the organizational data 2535, which may specify what components of a storage cluster system 1000 are to be represented with an object and/or various aspects of the manner in which an object is to be instantiated and/or represented within the memory 2560. By way of example, whether hardware and/or software components making up a single node 300 are to each be individually represented with an object in addition to or lieu of that entire single node 300 being represented with an object may be specified within the organizational data 2535. Also, the organizational data 2535 may specify the data structure(s) that are to be defined within each object entry 2533 as part of instantiating an object within the memory 2560. As part of specifying one or more of such data structures, the organizational data 2535 may specify the amount of space that is to be allocated within the memory 2560 for each object entry 2533.

In some embodiments, relationships between components that are so represented as objects may be treated as part of the properties of those objects. Thus, in such embodiments, each of the object entries 2533 may include indications of relationships that the associated component has with one or more other components. Such relationships may include a connection to another component via an interconnect (e.g., one of the example interconnects 399, 599*a*, 699*ab*, 899*ab*, etc.). Alternatively or additionally, such relationships may include a component being incorporated into another component such that one component is actually part of another component. In other embodiments, and as depicted, each relationship between two or more components may be represented with a relationship entry 2539 instantiated in a manner analogous to the instantiation of the object entries 2533, which may include indications of the type of relationship among two or more components and/or which component is at a higher or lower level relative to the other(s) where the relationship is of a hierarchical nature.

Figure 9:
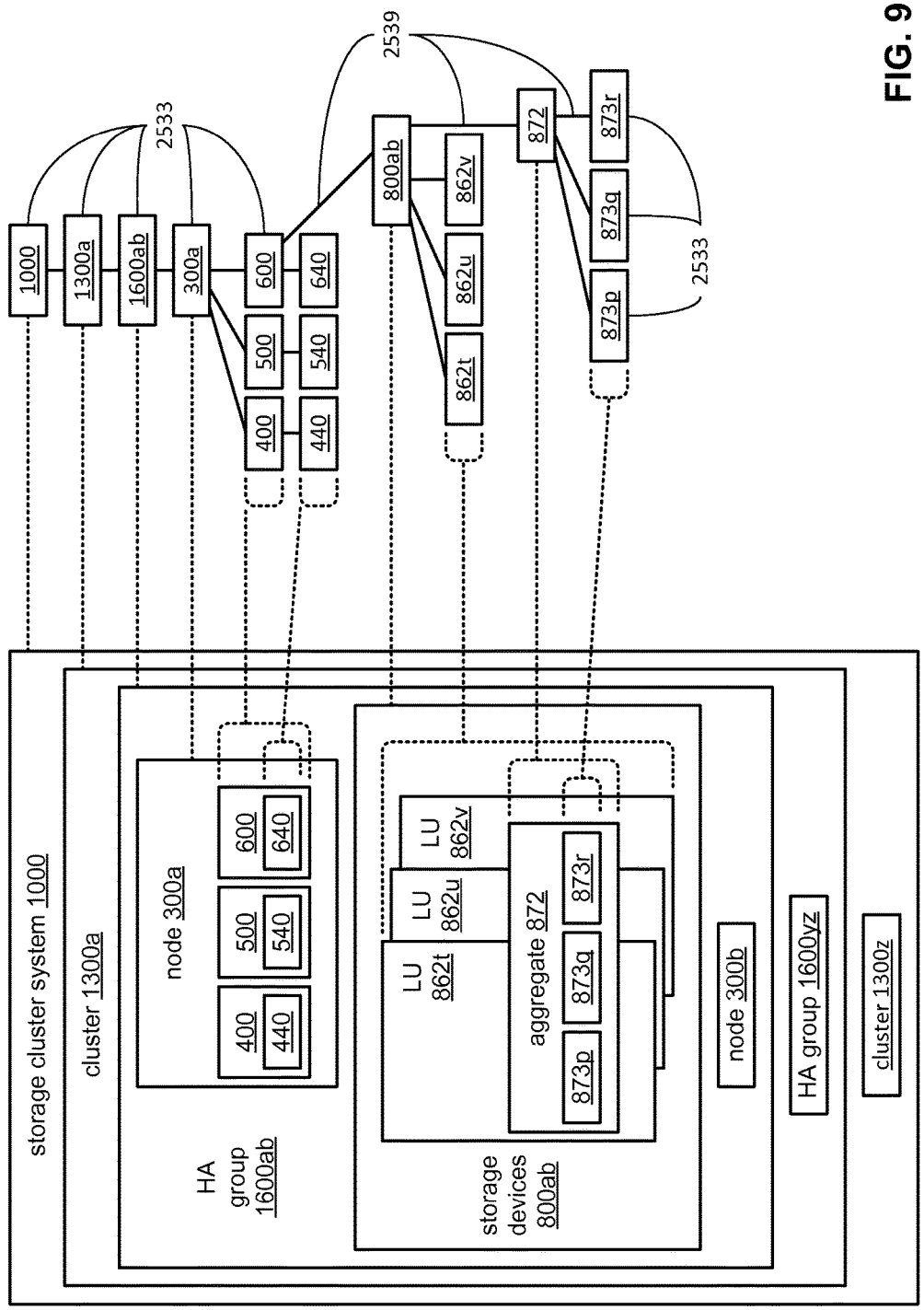
FIG. 9 illustrates an example embodiment of representing components of a storage cluster system as objects.

FIG. 9 depicts a portion of an example embodiment of representing components of the example storage cluster system 1000 of FIGS. 3 through 7 as objects. It should be noted that FIG. 9 is in no way an exhaustive depiction of representing components as objects as none of the objects within the cluster 1300*z*, the HA group 1600*yz*, the node 300*b*, etc. are depicted as being represented as objects. Instead, FIG. 9 depicts the manner in which components of the set of storage devices 800*ab* and the node 300*a* may be represented as objects, as well as the storage cluster system 1000, the cluster 1300*a*, the HA group 1600*ab*, the node 300*a* and the storage device 800*ab* may be represented as objects. As indicated in FIG. 9, each such object may be defined by an object entry 2533 generated within space allocated for it within the memory 2560.

Also depicted in FIG. 9 are indications of relationships between different ones of the objects. For example, the relationship of the node 300*a* as part of the HA group 1600*ab*, the relationship of the HA group 1600*ab* as part of the cluster 1300*a*, and the relationship of the cluster 1300*a* as part of the storage cluster system 1000 are depicted. Also depicted is the coupling of the set of storage devices 800*ab* to the data module 600 of the node 300*a* via the storage interconnect 899*ab*. Again, and as previously discussed, relationships between objects may be treated as part of the set of properties of those objects and may therefore be indicated among the indications of properties included in the object entries 2533 associated with those objects. Alternatively, and as depicted in FIG. 9, indications of relationships between objects may be separately stored in a relationship entry 2539 for each such relationship. Regardless of exactly what components of a storage cluster system 1000 are specified in the organizational data 2535 to be represented as objects, and regardless of the exact manner in which indications of relationships between objects are stored and/or what relationships are the ones for which indications are stored, the database component 2545 effectively models each storage cluster system 1000 as a combination of objects linked by relationships therebetween.

Returning to FIG. 8B, as database server 2500 receives information from the ingest server 2400 indicating that changes have occurred to one or more components, the database component 2545 may access the one or more object entries 2533 that correspond to those one or more components, and may alter one or more indications of properties in those object entries 2533 to provide indications of those changes. In some embodiments, the indications of properties within each of the object entries 2533 may be at least partly organized chronologically and/or may be timestamped to enable a chronological ordering of changes made to one or more of the properties as a mechanism to store a record of those changes made over time. Alternatively or additionally, where the changes indicated in information received from the ingest server 2400 include the addition of components to a storage cluster system 1000, the database component 2545 may generate more object entries 2533 as part of instantiating new objects to represent those additional components. In so doing, an indication of when a component was so added may be included among the properties stored in the corresponding object entry 2533. Also alternatively or additionally, where the changes indicated in information received from the ingest server 2400 include the removal of a component from a storage cluster system 1000, the database component 2545 may add an indication of that component having been removed as well as an indication of when the removal occurred to the properties included in the corresponding object entry 2533. Subsequently, the indication of the component having been removed may be treated by the database component 2545 as an indication that the object representing that removed component has itself been removed.

As an alternative to chronologically storing indications of events associated with particular objects as part of the properties of the object entries 2533 associated with those objects, the database component 2545 may store indications of events in individual ones of the event entries 2536. The event entries 2536 may be organized in a manner enabling the retrieval and stitching together of all events occurring at a specific time and/or occurring within a specific range of times. This may at least partially enable the state of all objects of a storage cluster system at a specified time and/or within a specific range of times to be determined. Alternatively and/or additionally, the event entries 2536 may be organized in a manner enabling the retrieval and stitching together of all events associated with a specified object. This may at least partially enable changes in the state of the specified object over a range of time and/or between two specified times to be determined In embodiments in which indications of events that change the state of one or more objects are stored separately from the object entries 2533, such as where indications of such events are stored in the event entries 2536, the properties of each of the object entries 2533 may then store indications of only the current state of the objects to which they correspond.

As further depicted, the database component 2545 may include a search component 2546 to respond to a request for information concerning a specific object and/or specified neighbors of a specific object by searching the system database 2530 for those object(s) and retrieving indications of their properties. Where a request concerns only a specific object, the search component 2546 may retrieve and provide indications of the properties of that object, alone, and those properties may include indications of relationships of that object to other objects. Where those indications of relationships are stored as properties of the object entry 2533 for that object, such retrieval may entail merely retrieving those indications from that object entry 2533. However, where those indications of relationships are separately stored in one or more relationship entries 2539, then the search component 2546 may search the relationship entries 2539 for the indications of those relationships in addition to searching for the one object entry 2533 that corresponds to the specified object.

However, where the request additionally concerns neighboring objects having relationships with the specific object, and where the indications of relationships to other objects are included as properties of that object that are stored in the object entry 2533 for that object, then the search component 2546 may retrieve those indications of relationships from that object entry 2533 and may use those indications to identify the other objects that are specified as also included in the request. The search component 2546 may then retrieve the object entries 2533 for those neighboring objects to retrieve the indications of the properties thereof to include in the response to the request. Alternatively, where the indications of relationships between objects are stored as separate relationship entries 2539, the search component 2546 may search among the relationship entries 2539 for ones of the relationship entries 2539 corresponding to relationships that are associated with the specified object, and may then use the indications of the properties of each of those relationships to identify the other objects that are specified as also included in the request.

Turning to FIG. 8C, in various embodiments, the visualization server 2600 incorporates one or more of a processor component 2650, a memory 2660 and an interface 2690 to couple the visualization server 2600 to at least the network 999. The memory 2660 may store rendering data 2632 and a control routine 2640. The control routine 2640 may incorporate a sequence of instructions operative on the processor component 2650 in its role as a main processor component of the visualization server 2600 to implement logic to perform various functions during execution of the control routine 2640 by the processor component 2650.

As depicted, the control routine 2640 may incorporate an API component 2646 to provide, through the network 999, an API for use by one or more of the administration devices 200 and/or 2200 to obtain visualizations generated by the visualization server 2600 of a storage cluster system 1000 and/or to obtain information needed to independently generate visualizations of a storage cluster system 1000. Among the APIs so provided may be a retrieval API that may be used to obtain indications and/or a visualization of the state of at least a portion of a storage cluster system 1000 at a specified time. Also among the APIs so provided may be a difference API that may be used to obtain indications and/or a visualization of the differences between the state of at least a portion of a storage cluster system 1000 at one specified time versus another specified time. Further among the APIs so provided may be an event API that may be used to obtain indications of events occurring within a storage cluster system that are associated with a specified object.

In some embodiments, the API component 2646 may be capable of accepting calls made to the retrieval, difference and/or event APIs that are received in the form of text received from one of the administration devices 200 or 2200 that conveys one or more of these APIs. More specifically, one of the administration devices 200 or 2200 may be operated in a manner in which it emulates a terminal of the visualization server 2600 that enables an administrator to manually enter text that is relayed to the API component 2646 that includes one or more of these APIs. In other embodiments, text conveying one or more of these APIs may be received from one of the administration devices 200 or 2200 that is automatically generated therein as a result of interpreting the manner in which an administrator interacts with a UI provided by that one of the administration devices 200 or 2200.

As also depicted, the control routine 2640 may incorporate a web component 2642 to provide, through the network 999, a web server that may be interacted with by one or more of the administration devices 200 and/or 2200 as a mechanism to transmit calls to the retrieval, difference and/or event APIs provided by the API component 2646. At least a subset of the APIs provided by the API component 2646 may be implemented as representational state transfer (REST) APIs that may be capable of being called in a string of characters conveyed as a parameter of a command of a scripting language such as hypertext markup language (HTML) commonly used in implementing webpages. More specifically, calls to one or more of these APIs may be transmitted by an administration device 200 or 2200 to the visualization server 2600 as part of a universal resource identifier (URI) included as a parameter of a HTML GET command. As familiar to those skilled in the art, such commands as the GET command in such scripting languages as HTML places few restrictions on the content of the strings of characters that are included as a parameter to specify a resource such. As a result, such commands may be employed as vehicles by which calls to one or more of the retrieval, difference and/or event APIs may be conveyed. Upon receiving such a command within such a scripting language, the web component 2642 may relay the API call conveyed therein to the API component 2646.

As further depicted, the control routine 2640 may incorporate a translation component 2645 to translate requests for information concerning at least a portion of a storage cluster system 1000 that include references to objects and/or relationships between objects into one or more sets of query instructions that may be used in searching different portions of the system database 2530 for those pieces of information. As previously discussed in reference to FIG. 8B, each system entry 2531 of the system database 2530 may be made up of multiple types of other entries that each correspond to different portions and/or different aspects of a storage cluster system 1000 associated with that system entry 2531. More specifically, a system entry 2531 may include multiple object entries 2533 that each correspond to a different component of a storage cluster system 1000, multiple event entries 2536 that each correspond to a different event that may be associated with one or more of the components of that storage cluster system 1000, and/or multiple relationship entries 2539 that each correspond to an interconnect between components of that storage cluster system 1000 or an instance of one component of that storage cluster system 1000 being incorporated into another. Thus, a call made to the retrieval, difference or event APIs may be translated by the translation component 2645 into query instructions to gain access to the system entry 2531 for a particular cluster, and then into one or more separate sets of query instructions to obtain information from one or more of each of the object entries 2533, one or more of the event entries 2536 and/or one or more of the relationship entries 2539. The translation component 2645 may provide those different sets of query instructions to the search component 2546 within the database server 2500 via the network 999 to be executed by the search component 2546 to obtain the requested information.

Upon receiving such requested information from the database server 2500, the translation component 2645 may assemble the requested information from the different queries into a single set of information that the translation component 2645 may then relay to the API component 2646. The API component 2646 may then format or otherwise assemble the requested information into a response appropriate for the call that was made to one of the retrieval, difference or event APIs. If the API call was conveyed to the API component 2646 via text transmitted from one of the administration devices 200 or 2200, then the API component 2646 may transmit the requested information back to that one of the administration devices 200 or 2200 as text and/or in any of a variety of other formats to thereby enable that one of the administration devices 200 or 2200 to independently generate a visualization to present to an administrator based on that requested information. If the API call was conveyed to the web component 2642 via a text string embedded within a command of a scripting language transmitted from the one of the administration devices 200 or 2200, then the web component 2642 may transmit the requested information back to that one of the administration devices 200 or 2200 embedded in one or more statements of that same scripting language to thereby enable that one of the administration devices 200 or 2200 to independently generate a visualization to present to an administrator based on that requested information.

However, as an alternative to directly sending such requested information back to the one of the administration devices 200 or 2200 that requested it, the web component 2642 may itself generate a visualization based on the requested information, and may transmit that visualization to that one of the administration devices 200 or 2200. More specifically, the web component 2642 may render an image within the visualization server 2600 (e.g., within a portion of the memory 2660) that includes a visualization that depicts the requested information, and then the web component 2642 may transmit a bitmap, vector display list or other form of representation of that visualization to the that one of the administration devices 200 or 2200 for it to then present on a display. In so doing, the web component 2642 may refer to the rendering data 2632, which may specify various parameters for how components and/or relationships between components are to be represented in a visualization, and/or may include pre-rendered bitmap or vector-based images of components and/or relationships between components to be used in generating a visualization.

Turning to FIG. 8D, in various embodiments, each of the administration devices 200 or 2200 incorporates one or more of a processor component 250, a memory 260, an input device 220, a display 280, and an interface 290 by which to be coupled to at least the network 999. The memory 260 may store a control routine 240. The control routine 240 may incorporate a sequence of instructions operative on the processor component 250 in its role as a main processor component of one of the administration devices 200 or 2200 to implement logic to perform various functions during execution of the control routine 240 by the processor component 250.

As depicted, the control routine 240 may incorporate a communications component 249 to operate the interface 290 to establish any of a variety of types of communications with the visualization server 2600. In some embodiments, the communications component 249 may transmit one or more security credentials to the visualization server 2600 to establish that the administration device 200 or 2200 is an accepted device for use in providing visualizations of a storage cluster system 1000 and/or that an administrator operating it is authorized to have access to such visualizations.

As also depicted, the control routine 240 may incorporate a user interface (UI) component 248 to operate the input device 220 and/or the display 280 to provide an administrator operating the administrative device 200 or 2200 with a UI by which they may interact to provide requests for visualizations of a storage cluster system 1000. In some embodiments, the UI component 248 may enable an administrator to manually enter calls to one or more of the retrieval, difference and/or event APIs provided by the API component 2646 as text via the input device 220 where the input device 220 may include a keyboard. In so doing, the UI component 248 may operate the display 280 to provide a text editing environment or a command line to facilitate such entry of text. This may be done, at least initially, to allow an administrator to manually enter a call to the retrieval API to obtain information concerning a particular storage cluster system 1000 that the administrator is tasked with overseeing as part of obtaining a visualization thereof.

The text so entered by an administrator may then be transmitted by the communications component 249 to the visualization server 2600.

As further depicted, the control routine 240 may incorporate an interpretation component 242 to cooperate with the UI component 248 to interpret operation of the input device 220 by an administrator as part of interacting with menus and/or images of objects that the UI component 248 may present on the display 280. By way of example, instead of the UI component 248 operating the display 280 to present a command prompt or text editor to enable text entry of API calls by an administrator, the UI component 248 may operate the display 280 to present a menu of options that the administrator may interact with through operation of the input device 220. More specifically, the UI component 248 may present on the display 280 a menu populated with selectable menu items that each correspond to a different storage cluster system 1000 from which the administrator may select a particular storage cluster system 1000 to be presented with a visualization of. Further, the UI component 248 may also present a graphical pointer on the display 280 (e.g., a mouse pointer) that may be manipulated through operation of the input device 220 to effect such a selection where the input device 220 includes a form of pointer device (e.g., a mouse, a touchpad, a trackball, a joystick, etc.). The interpretation component 242 may respond to a selection of a menu item corresponding to a particular storage cluster system 1000 by itself generating the text of a call to the retrieval API to request information concerning the particular storage cluster system 1000 that has just been selected as part of preparing to present the requested visualization on the display 280. This automatically generated text may then be transmitted to the visualization server 2600 by the communications component 249 just as manually entered text of the same call would be.

As previously discussed, in response to a request for information concerning, whether an initial visualization of an entire storage cluster system 1000 or a subsequent visualization of a portion thereof, the visualization server 2600 may respond by providing either data representing a visualization as already generated by the visualization server 2600 (e.g., a bitmap or a vector display list representing a visualization). The communications component 249 may relay such a representation of a visualization to the UI component 248 to enable the UI component 248 to present the visualization on the display. Alternatively, and as also previously discussed, the visualization server 2600 may respond by providing information from the system entry 2531 of the system database 2530 that corresponds to that storage cluster system 1000 to enable the administration device 200 or 2200 to independently generate a visualization therefrom. The communications component 249 may relay such received information to the UI component 248, and the UI component 248 may employ the information to generate a visualization of at least a portion of that storage cluster system 1000 (e.g., render the visualization into a portion of the memory 260) and then present that visualization on the display 280.

With a visualization presented of at least a portion of a storage cluster system 1000 presented on the display 280, the UI component may monitor further operation of the input device 220 for indications of an administrator operating it to select menu items and/or select portions of the visualization as part of providing a request for another visualization of a different scope than the one currently presented. Again, the interpretation component 242 may cooperate with the UI component 248 to interpret such actions by the administrator and/or to generate the text of new calls to one or more of the APIs provided by the API component 2646 of the visualization server 2600. In some embodiments, the UI component 248 and/or the interpretation component 242 may be components of a web browser to interact with the visualization server 2600 as a web server. It may be that the interpretation component 242 is a so-called "add-on" or "plug-in" that augments the UI component 248 with ability to so interpret operation of the input device 220 by an administrator and to automatically generate text that includes such API calls in response.

It should be noted that although FIG. 8A-D depict each of the servers 2400, 2500 and 2600 as separate and distinct computing devices with separate and distinct processor components and/or memories, other embodiments are possible in which two or more of the servers 2400, 2500 and 2600 may be combined into a single server. By way of example, a processor component of a single server may execute the instructions of both the control routines 2440 and 2540, or of both the control routines 2540 and 2640. Also by way of example, two or more of the servers 2400, 2500 and 2600 may be implemented as virtual machines generated within a single server by at least one processor component of that single server.

Figure 10A:
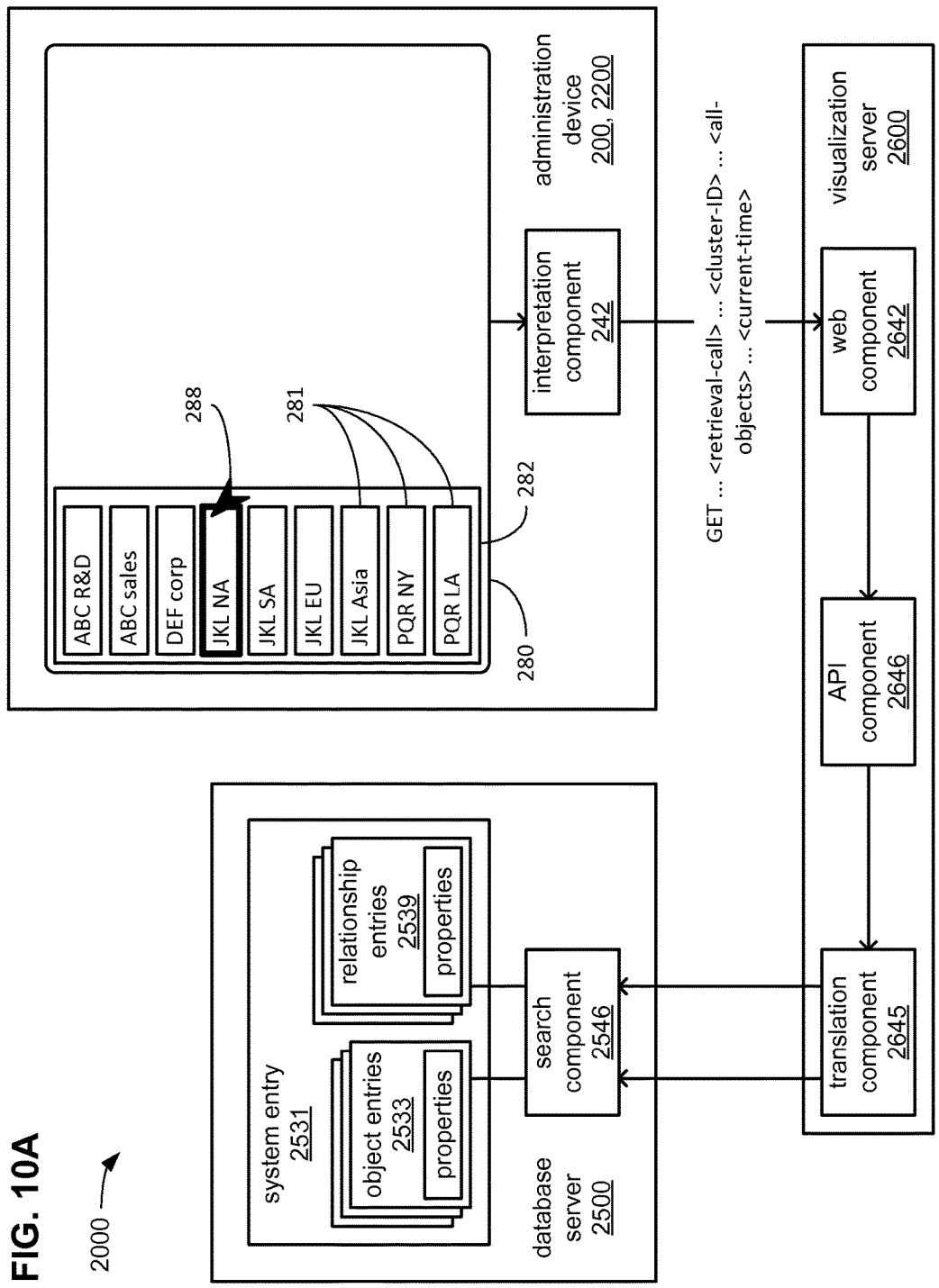
FIG. 10A illustrates an example embodiment of calling a retrieval API.
Figure 10B:
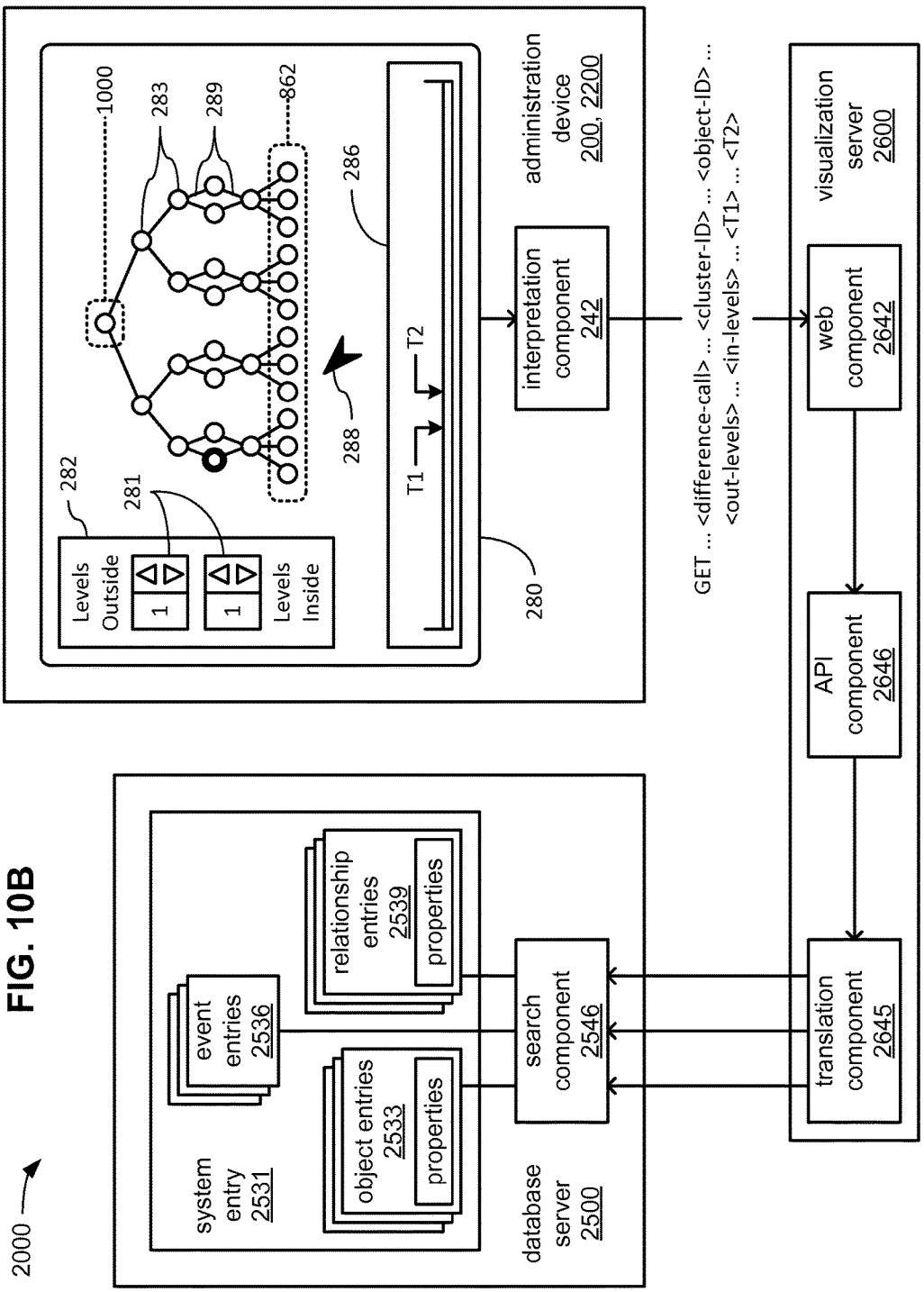
FIG. 10B illustrates an example embodiment of calling a difference API.
Figure 10C:
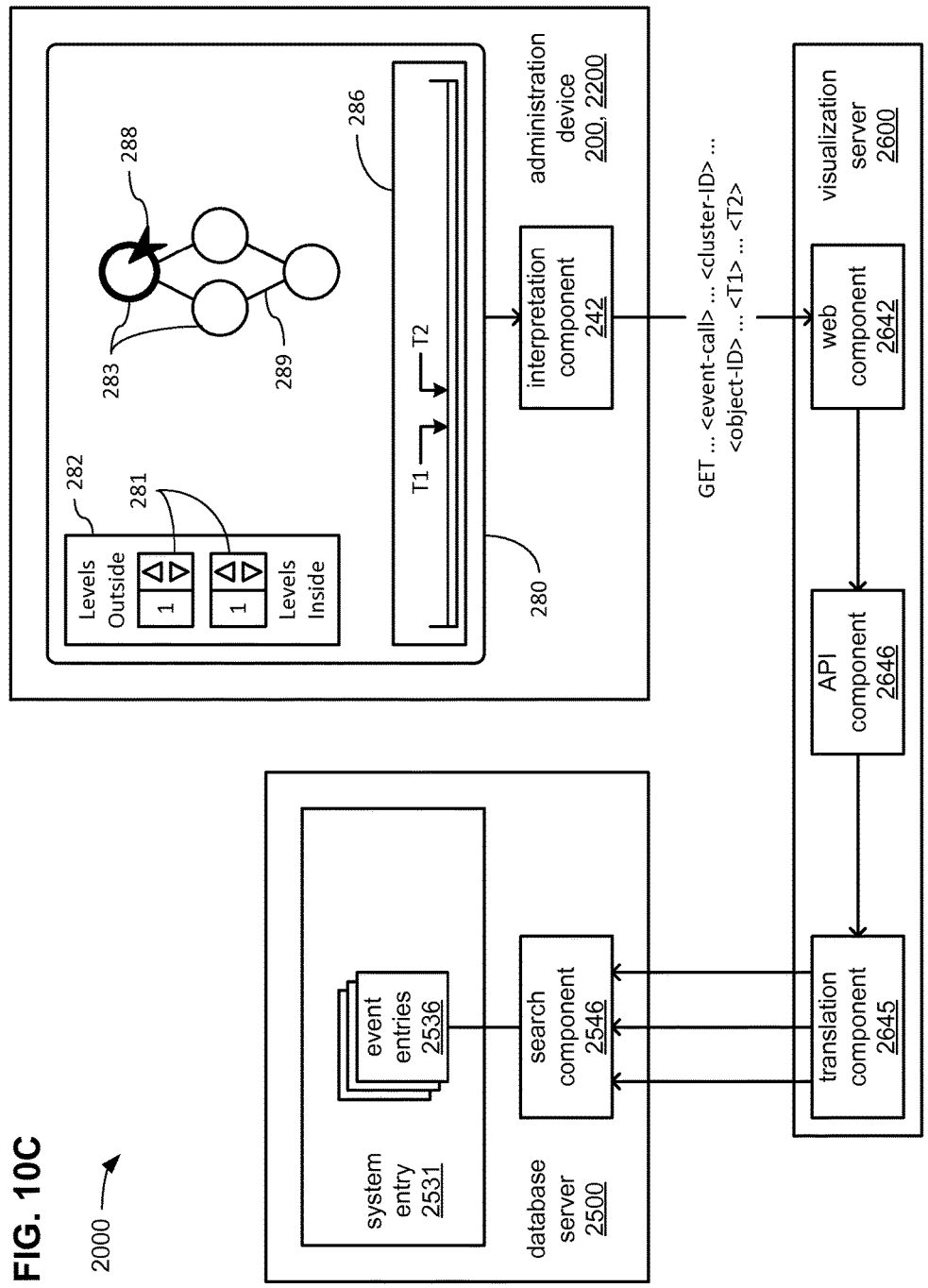
FIG. 10C illustrates an example embodiment of calling an event API.

FIGS. 10A-C each illustrate an example embodiment of an administration device 200 or 2200 calling an API provided by visualization server 2600 of the example administration system 2000 of FIGS. 8A-8D as part of presenting visualizations of at least portions of an example storage cluster system 1000 in greater detail. More specifically, FIG. 10A depicts aspects of calling the retrieval API to retrieve information for presenting an initial visualization of a whole storage cluster system 1000, FIG. 10B depicts aspects of calling the difference API to retrieve information for presenting a visualization of a portion of that storage cluster system 1000, and FIG. 10C depicts aspects of calling the event API to retrieve information for presenting details of events associated with a single object of that storage cluster system 1000.

Turning to FIG. 10A, a menu 282 of selectable menu items 281 is presented on the display 280 of an administration device 200 or 2200. The depicted menu items 281 each correspond to a different one of multiple storage cluster systems 1000 for which one or more visualizations may be requested. As depicted, an administrator tasked with overseeing operation of a storage cluster system 1000 operated by "JKL" corporation for its North American ("NA") branch has operated the administration device 200 or 2200 (e.g., by manually operating the input device 220) to use an on-screen pointer 288 to select the menu item 281 that corresponds to that storage cluster system 1000, thereby requesting an initial visualization thereof. The interpretation component 242 detects the selection of that menu item 281, and automatically generates a command in a scripting language that conveys a call to the retrieval API.

In this depicted example, the scripting language used may be HTML, and more specifically, the command used may be the GET command of HTML. As previously discussed, such HTML commands are able to accept a string of text that specifies one or more parameters while placing relatively few requirements on the contents of that parameter string. As depicted in this example, the GET command is accompanied by a parameter string that includes the call to the retrieval API and various indications of the scope of the information being requested, including an identifier for the selected storage cluster system 1000 (specifically, the "JKL NA" storage cluster system), an indication that information associated with all objects of the selected storage cluster system 1000 is requested, and an indication that the requested information is to indicate the current state of those objects (e.g., the state of those objects at the current time). The indications of the scope of the requested information as including all of the objects and as indicating the states of those objects a the current time may be default selections made by the interpretation component 242 in some embodiments when generating such a GET command in response to the act of selecting one of the menu items 281 that corresponds to one of the multiple storage cluster systems 1000. In other embodiments, the interpretation component 242 may specify a more limited scope for the requested information in the parameter string, such as only a subset of the objects of a storage cluster system 1000, for example.

Following its generation, the GET command with the parameter string may be transmitted to the web component 2642 of the visualization server 2600 via the network 999, where the parameter string is extracted from the GET command, and provided to the API component 2646. The API component 2646 parses the parameter string and determines that it is the retrieval API that has been called and determines the specified scope of the requested information. The API component 2646 then provides the translation component 2645 with indications that information concerning the current state of all objects of the "JKL NA" storage cluster system has been requested. The translation component 2645 translates these indications of a request for information concerning the current state of all objects of a particular one of the storage cluster systems 1000 into database query instructions executable by the search component 2546 to first locate the system entry 2531 for the particular storage cluster system 1000 (specifically, the "JKL NA" storage cluster system), and then to retrieve indications of the current status from all of the object entries 2533 and/or the relationship entries 2539 within that system entry 2531.

Turning to FIG. 10B, another menu 282 of menu items 281 is presented on the display 280 of an administration device 200 or 2200, along with a timeline scroll bar 286 and a visualization of the particular storage cluster system 1000 selected in FIG. 10A. The visualization is made up of selectable object items 283 that each correspond to an object of the particular storage cluster system 1000 and selectable relationship items 289 that each correspond to a relationship between two objects that are each visually presented with one of the selectable object items 283. As depicted, the selectable object item 283 at the root in this example visualization corresponds to the object that represents the entirety of the particular storage cluster system 1000, while each of the selectable object items 283 furthest from the root correspond to an object that represents one of the individual LUNs 862 of the particular storage cluster system 1000.

As also depicted, one of the selectable object items 283 has been selected through use of the on-screen pointer 288 as a mechanism to select a particular object within to be depicted in a requested new visualization of only a portion of the particular storage cluster system 1000. Within the menu 282, the menu items 281 provide a mechanism to specify how large a neighborhood of other objects surrounding the particular object are to also be included in the new visualization. In some embodiments, objects that are closer to the root than the particular object may be deemed to be at level(s) of the object-based model of the particular storage cluster system 1000 that are outside the particular object, while objects that are further away from the root than the particular object may be deemed to be at level(s) of the object-based model of the particular storage cluster system 1000 that are inside the particular object.

The concept of "outside" and "inside" relative to an object may be based on the occurrence of relationships between objects in which one object represents a component that is incorporated into another component represented by the other object such that the one component is deemed to be "inside" the other component. Such a relationship may be depicted with a selectable relationship item 289 (e.g., the depicted line segments) extending between the selectable object items 283 for each of the two components, with the one component that is incorporated into the other being positioned further away from the root by the one level of relationship represented by that selectable relationship item 289. As depicted, the two menu items 281 have been operated in a manner to specify that neighboring objects that are one level outside and one level inside the particular object that has been selected are to be included in the new requested visualization.

As further depicted, within the timeline scroll bar 286, a pair of times T1 and T2 have been selected as part of requesting that the new visualization depict how the states of objects and relationships therebetween have changed between the times T1 and T2. Thus, while the visualization already presented on the display 280 is based on information concerning the state of the objects and relationships between objects of the particular storage cluster system 1000 at a single particular time (e.g., the current time), the new visualization being requested by an administrator through such use of the timeline scroll bar 286 is to be based on information concerning the state of objects and relationships between objects of the particular storage cluster system 1000 at two particular times T1 and T2.

The interpretation component 242 detects the selection of the particular subset of objects and relationships between objects through the selection of the particular selectable object item 283 and through the selection of only neighboring objects that are within one outside and only one inside level via the menu items 281. The interpretation component 242 also detects the selection of two times via the timeline scroll bar 286, and automatically generates a command in the same scripting language that conveys a call to the difference API, instead of the retrieval API. Again, in this depicted example, the scripting language used may be HTML, and the HTML command used may be the GET command. In a manner similar to the example GET command of FIG. 10A, the GET command in this example of FIG. 10B is accompanied by a parameter string that includes the call to the difference API and various indications of the scope of the information being requested, including an identifier for the selected storage cluster system 1000 (specifically, the "JKL NA" storage cluster system), an identifier of the particular object corresponding to the selectable object item 283 that has been selected, an indication of the number of levels outside of the selected object from which neighboring objects are selected, an indication of the number of levels inside of the selected object from which neighboring are selected, and indications of the times T1 and T2.

Following its generation, this GET command with this parameter string may be transmitted to the web component 2642 of the visualization server 2600 via the network 999, where the parameter string is extracted from the GET command, and provided to the API component 2646. The API component 2646 parses this parameter string and determines that it is the difference API that has now been called and determines the specified scope of the requested information. The API component 2646 then provides the translation component 2645 with indications that information concerning differences in the states of this more limited set of objects of the "JKL NA" storage cluster system between times T1 and T2 has been requested. The translation component 2645 translates these indications of a request for information concerning this more limited set of objects into database query instructions executable by the search component 2546 to first locate the system entry 2531 for the particular storage cluster system 1000 (specifically, the "JKL NA" storage cluster system), and then to retrieve information from a subset of the object entries 2533 and/or the relationship entries 2539 within that system entry 2531 that correspond to the more limited set of objects and the relationships thereamong. The translation component 2645 also translates the indications of a request for information concerning the states of this more limited set of objects at the particular times T1 and T2 into query instructions executable by the search component 2546 to also retrieve information from the event entries 2536 that provide indications of events that may have defined the state of this more limited set of objects and relationships at each of the times T1 and T2.

As recognizable to those skilled in the art, any of a variety of data structures may be used to organize the data making up each system entry 2531 of the system database 2530, and as a result, the manner in which the data within a single system entry 2531 may need to be searched to retrieve the states of some or all of the objects associated with a storage cluster system 1000 at a time earlier than the current time may vary greatly. By way of example, if each of the object entries 2533 includes indications of only the current state of a corresponding object, then it may be necessary to search through the ones of the event entries 2536 detailing events that affect a particular object starting with the most recent of those events and proceeding backwards into the past to that earlier time. Also, as each such event is found while proceeding backwards into the past, the changes in state made by each such event to that particular object may need to be analyzed to derive the state of that object at that earlier time. The provision of such APIs as the retrieval, difference and event APIs described herein for use by the administration devices 200 and/or 2200 removes the burden of needing to directly generate the query instructions to perform such searches and to separate the entries that include pertinent information from those that do not. The provision of such APIs also enables the manner in which the data within each of the system entries 2531 to be modified and/or entirely changed while leaving the API calls used to request information therefrom unchanged, and vice versa.

Turning to FIG. 10C, the same menu 282 and the same timeline scroll bar 286 of FIG. 10B are again presented on the display 280 of an administration device 200 or 2200, along with the new visualization of a portion of the storage cluster system 1000 that was requested via the actions described in FIG. 10B. The new visualization is also made up of selectable object items 283 that each correspond to an object of the particular storage cluster system 1000 and selectable relationship items 289 that each correspond to a relationship between two objects that are each visually presented with one of the selectable object items 283.

As depicted, one of the selectable object items 283 has been selected through use of the on-screen pointer 288 as a mechanism to request a presentation of events that have occurred during the period of time extending from T1 to T2 that are associated with the object that corresponds to the selected one of the selectable object items 283. More specifically, the request may be for a presentation of a listing of such events in a manner that enables one or more of those events to be selected to present descriptive text thereof.

The interpretation component 242 detects the selection of the particular object through the selection of the particular selectable object item 283. The interpretation component 242 also detects that the two times earlier selected in the timeline scroll bar 286 remain selected, and automatically generates a command, again in the same scripting language, that conveys a call to the event API, instead of either of the retrieval or difference APIs. Again, in this depicted example, the scripting language used may be HTML, and the HTML command used may again be the GET command. In a manner similar to two previously discussed example GET commands of FIGS. 10A and 10B, the GET command in this example of FIG. 10C is accompanied by a parameter string that includes the call to the event API and various indications of the scope of the information being requested, including an identifier for the selected storage cluster system 1000 (specifically, again, the "JKL NA" storage cluster system), an identifier of the particular object corresponding to the selectable object item 283 that has been selected, and indications of the times T1 and T2.

Following its generation, this GET command with this parameter string may be transmitted to the web component 2642 of the visualization server 2600 via the network 999, where the parameter string is extracted from the GET command, and provided to the API component 2646. The API component 2646 parses this parameter string and determines that it is the event API that has now been called and determines the specified scope of the requested information. The API component 2646 then provides the translation component 2645 with indications that information concerning events associated with the single selected object of objects of the "JKL NA" storage cluster system between times T1 and T2 has been requested. The translation component 2645 translates these indications of a request for information concerning events associated with this single object through the period of time between T1 and T2 into database query instructions executable by the search component 2546 to first locate the system entry 2531 for the particular storage cluster system 1000 (specifically, the "JKL NA" storage cluster system), and then to retrieve information from a subset of the event entries 2536 within that system entry 2531 that are associated with the single object and that period of time.

In various embodiments, each of the processor components 450, 550, 650, 2450, 2550 and 2650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, one or more of the control routines 440, 540, 640, 2440, 2540 and 2640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, one or more the memories 460, 560, 660, 2460, 2560 and 2660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, one or more of the interfaces 490, 590, 690, 2490, 2590 and 2690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 11:
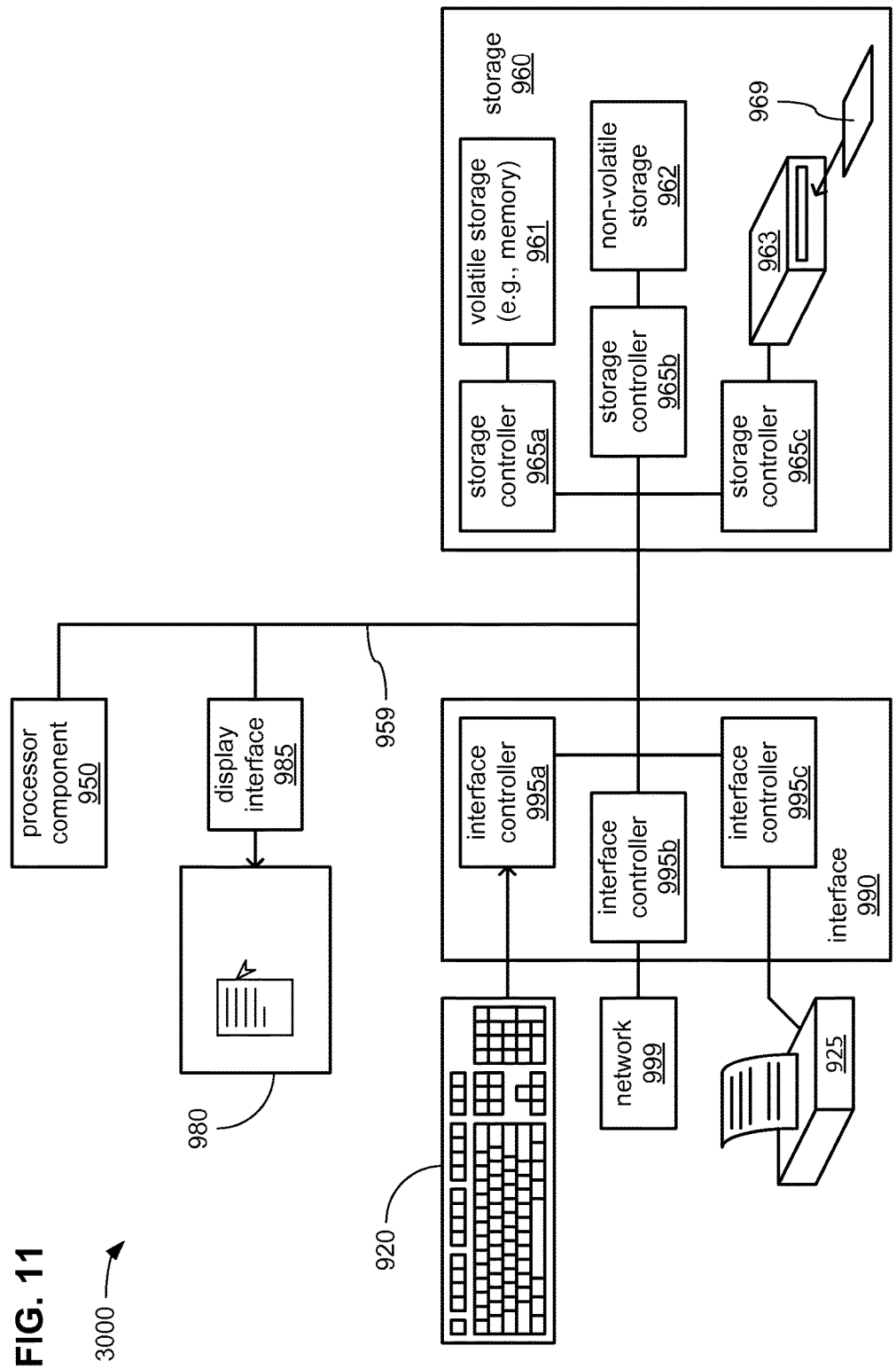
FIG. 11 illustrates a processing architecture according to an embodiment.

FIG. 11 illustrates an embodiment of an exemplary processing architecture 3000 suitable for implementing various embodiments as previously described. More specifically, the processing architecture 3000 (or variants thereof) may be implemented as part of one or more of the client devices 100, the administration devices 200, the nodes 300, the management modules 400, the network modules 500, the data modules 600, the administration devices 2200, the ingest server 2400, the database server 2500, the visualization server 2600, the documentation server 2800, and the sets of storage devices 800*ab*, 800*cd* or 800*yz*. It should be noted that components of the processing architecture 3000 are given reference numbers in which the last two digits correspond to the last two digits of reference numbers of at least some of the components earlier depicted and described as part of the devices 100, 200, 800 and/or 2200; the servers 2400, 2500, 2600 and/or 2800; and/or the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 may include any of a wide variety of commercially available processors, employing any of a wide variety of technologies and implemented with one or more cores physically combined in any of a number of ways.

As previously discussed, the internal storage 960 may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface controller 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. An apparatus comprising:
a memory containing machine readable medium comprising machine executable code having stored thereon instructions; and a processor of a computing device coupled to the memory to execute the machine executable code for:
an application program interface (API) component of the computing device accessed by another device via a network by a first request for information associated with an object representing a component of a storage system, where object properties indicate component attributes and a relationship with any other component of the storage system; wherein the request indicates a limitation of scope for the requested information; and
a translation component of the computing device to generate query instructions to search for a system entry corresponding to the storage system within a system data structure, based on an object state indication received in an output of a first sub-component of a plurality of sub-components of the API, the first sub-component identified based on information included in the first request; and to search for the requested information within the system entry, the search limited based on the indication of limited scope;

wherein the requested information is retrieved from the system entry and the computing device transmits a visual representation of the object state rendered using the retrieved information to the other device via the network;

wherein a second request is generated using one or both of a selectable object and a relationship link of a hierarchical structure having a plurality of selectable objects representing storage system components interconnected by selectable relationship links, the hierarchical structure provided by the visual representation indicating a state of the storage system components, when the object represents the storage system, and the second request is used to identify a second sub-component of the API for providing an output to retrieve information for the second request having a scope different than the scope of the first request.

2. The apparatus of claim 1, wherein a network interface of the computing device receives from the network a scripting language command that conveys the request to the API along with the indication of limitation of scope of the requested information, and the apparatus comprising a web component to extract the request to the API and the indication of limitation of scope from the command.

3. The apparatus of claim 2, wherein the scripting language comprising a version of hypertext markup language (HTML).

4. The apparatus of claim 1, wherein information for the system data structure is received recurrignly from the storage system indicating states of multiple components of the storage system.

5. The apparatus of claim 1, wherein the system data structure is a database and a database component to generate the system entry to include a separate object entry corresponding to each component of multiple components of the storage system to treat each component of the multiple components as an object, wherein each object entry comprises a data structure to store indications of various aspects of operation of a corresponding one of the multiple components as properties of the corresponding object.

6. The apparatus of claim 5, wherein the database component to generate the system entry to comprise multiple event entries, wherein each event entry of the multiple event entries corresponds to an event that is associated with the storage system, and wherein each event entry comprises an indication of a type of event and an indication of which object of multiple objects the event entry is associated with.

7. The apparatus of claim 1, wherein the API component comprising the second sub-component having a difference API that is callable to request information indicating a difference in state of the object between a first state of the object at a first time and a second state of the object at a second time, wherein the first time and the second time are specified in the request to the API as limitations of scope of the requested information.

8. The apparatus of claim 7, further comprising a web component to generate a visualization of at least a portion of the storage system that depicts the difference in state of object between the first and second times, and to operate the network interface to transmit a representation of the visualization to the other device via the network.

9. A computer-implemented method comprising:
accessing an application programming interface (API) presented by a computing device via a network to another device with a first request for information associated with an object representing a component of a storage system, where object properties indicate component attributes and a relationship with any other component of the storage system; wherein the first request indicates a limitation of scope for the requested information;
identifying a first sub-component from a plurality of sub-components of the API based on information included in the first request;
generating an output by the first sub-component for processing the first request;
providing query instructions to search for a system entry corresponding to the storage system within a system data structure based on an indication of an object state provided by the output of the first sub-component;
retrieving the requested information from the system entry by limiting the search based on the indication of limited scope; and
transmitting by the computing device a visual representation of the object state rendered using the retrieved information to the other device via the network;
wherein a second request is generated using one or both of a selectable object and a relationship link of a hierarchical structure having a plurality of selectable objects representing storage system components interconnected by selectable relationship links, the hierarchical structure provided by the visual representation indicating a state of the storage system components, when the object represents the storage system, and the second request is used to identify a second sub-component of the API for providing an output to retrieve information for the second request having a scope different than the scope of the first request.

10. The computer-implemented method of claim 9, wherein the API comprising the second sub-component having a difference API that is callable to request information indicating a difference in state of the object between a first state of the object at a first time and a second state of the object at a second time, wherein the first time and the second time are specified in the request to the API as the limitation of scope of the requested information.

11. The computer-implemented method of claim 10, wherein the system entry comprising multiple event entries, wherein each event entry of the multiple event entries corresponds to an event that is associated with the storage system, wherein each event entry comprises an indication of a type of event and an indication of which object of multiple objects the event entry is associated with, and wherein the computer-implemented method comprises searching for and analyzing at least one event entry that corresponds to an event that occurred between the first and second times to determine at least one of the first or second states of the component.

12. The computer-implemented method of claim 9, further comprising:
recurringly receiving information from the storage system indicating states of multiple components of the storage system; and
generating the system entry to include a separate object entry corresponding to each component of the multiple components to treat each component of the multiple components as an object, wherein each object entry comprises a data structure to store indications of various aspects of the operation of a corresponding one of the multiple components as properties of the corresponding object.

13. The computer-implemented method of claim 12, further comprising generating multiple event entries within the system entry, wherein each event entry of the multiple event entries corresponds to an event indicated in the information recurringly received from the storage system to be associated with the storage system, and wherein each event entry comprises an indication of a type of event and an indication of which object of multiple objects the event entry is associated with.

14. The computer-implemented method of claim 12, further comprising generating indications within each object entry of at least one event indicated in the information recurringly received from the storage system to be associated with the component of the storage system associated with the object entry, and wherein each indication of at least one event comprises an indication of a type of event.

15. The computer-implemented method of claim 14, further comprising searching for and analyzing an indication of at least one event that that occurred between first and second times within the object corresponding to the component to determine at least one of a first state of the component at the first time or a second state of the component at the second time.

16. A non-transitory machine-readable medium having stored thereon instructions for performing a method comprising machine executable code which when executed by at least one machine, causes the machine to:
  access an application programming interface (API) presented by a computing device via a network to another device with a first request for information associated with an object representing a component of a storage system, where object properties indicate component attributes and a relationship with any other component of the storage system; wherein the first request indicates a limitation of scope for the requested information;
  identify a first sub-component from a plurality of sub-components of the API based on information included in the first request;
  generate an output by the first sub-component for processing the first request;
  provide query instructions to search for a system entry corresponding to the storage system within a system data structure based on an indication of an object state provided by the output of the first sub-component;
  retrieve the requested information from the system entry by limiting the search based on the indication of limited scope; and
  transmitting by the computing device a visual representation of the object state rendered using the retrieved information to the other device via the network;
  wherein a second request is generated using one or both of a selectable object and a relationship link of a hierarchical structure having a plurality of selectable objects representing storage system components interconnected by selectable relationship links, the hierarchical structure provided by the visual representation indicating a state of the storage system components, when the object represents the storage system, and the second request is used to identify a second sub-component of the API for providing an output to retrieve information for the second request having a scope different than the scope of the first request.

17. The non-transitory machine-readable storage medium of claim 16, wherein the API comprising the second sub-component having a difference API that is callable to request information indicating a difference in state of the object between a first state of the object at a first time and a second state of the object at a second time, wherein the first time and the second time are specified in the request to the API as the limitation of scope of the requested information.

18. The non-transitory machine-readable storage medium of claim 17, the system entry comprising multiple event entries, wherein each event entry of the multiple event entries corresponds to an event that is associated with the storage system, wherein each event entry comprises an indication of a type of event and an indication of which object of multiple objects the event entry is associated with, and wherein the processor component is caused to search for and analyzing at least one event entry that corresponds to an event that occurred between the first and second times to determine at least one of the first or second states of the component.

19. The non-transitory machine-readable storage medium of claim 16; wherein the request is in a scripting language command sent to the API along with the indication of limitation of scope of the requested information.

20. The non-transitory machine-readable storage medium of claim 19, the machine executable code further causes the machine to:
  generate a visualization of at least a portion of the storage system that depicts the difference in state of object between the first and second times; and
  transmit a representation of the visualization to the other device via the network.

* * * * *